United States Patent
Van Huben et al.

(10) Patent No.: US 6,738,871 B2
(45) Date of Patent: May 18, 2004

(54) METHOD FOR DEADLOCK AVOIDANCE IN A CLUSTER ENVIRONMENT

(75) Inventors: Gary A. Van Huben, Poughkeepsie, NY (US); Michael A. Blake, Wappingers Falls, NY (US); Pak-Kin Mak, Poughkeepsie, NY (US); Adrian Eric Seigler, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 09/745,830

(22) Filed: Dec. 22, 2000

(65) Prior Publication Data

US 2002/0083149 A1 Jun. 27, 2002

(51) Int. Cl.⁷ .............................................. G06F 12/00
(52) U.S. Cl. ...................... 711/150; 711/124; 711/130; 711/147; 711/148
(58) Field of Search ................................ 711/124, 130, 711/148, 147, 150; 709/214

(56) References Cited

U.S. PATENT DOCUMENTS 5,875,462 A * 2/1999 Bauman et al. ............. 711/119
5,940,828 A * 8/1999 Anaya et al. ................... 707/8

FOREIGN PATENT DOCUMENTS

EP          945798 A2 * 9/1999 ............. G06F/9/46

OTHER PUBLICATIONS

William Stallings, Operating Systems: Internals and Design Principles, 1998 Prentice–Hall, pp. 253–256.*

* cited by examiner

Primary Examiner—Mano Padmanabhan
Assistant Examiner—John M Ross
(74) Attorney, Agent, or Firm—Lynn L. Augspurger

(57) ABSTRACT

A remote resource management system for managing resources in a symmetrical multiprocessing environment having a plurality of clusters of symmetric multiprocessors each of which provides interfaces between cluster nodes of the symmetric multiprocessor system with a local interface and an interface controller. One or more remote storage controllers each has a local interface controller and a local-to-remote data bus. A remote fetch controller is responsible for processing data accesses in accordance with the methods described.

6 Claims, 16 Drawing Sheets

35

| RSAR OPERATION | OPERATION LSAR IS PROCESSING | | | |
|---|---|---|---|---|
| | LRU CAST OUT | STORE PAD | I/O STORE | MOVE PAGE STORE |
| LRU CAST OUT | IGNORE | IGNORE | IGNORE | IGNORE |
| STORE PHYSICAL ABSOLUTE | IGNORE | IGNORE | IGNORE | IGNORE |
| STORE PAD | WAIT | ABORT | IGNORE | ABORT |
| EXCLUSIVE INVALIDATE | WAIT | ABORT | IGNORE | ABORT |
| I/O STORE (including query) | WAIT | ABORT | IGNORE | ABORT |
| MOVE PAGE STORE | WAIT | ABORT | IGNORE | ABORT |

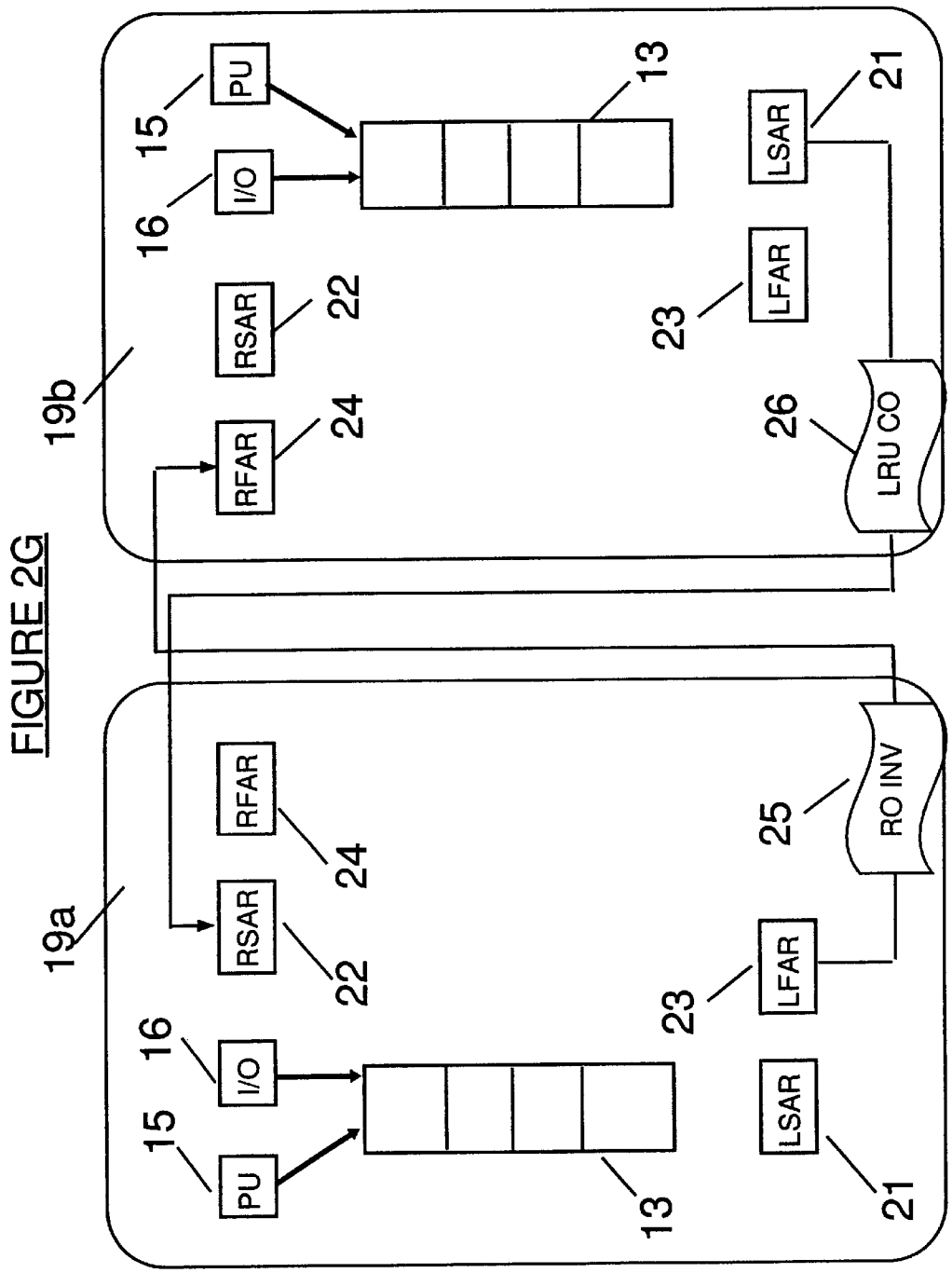

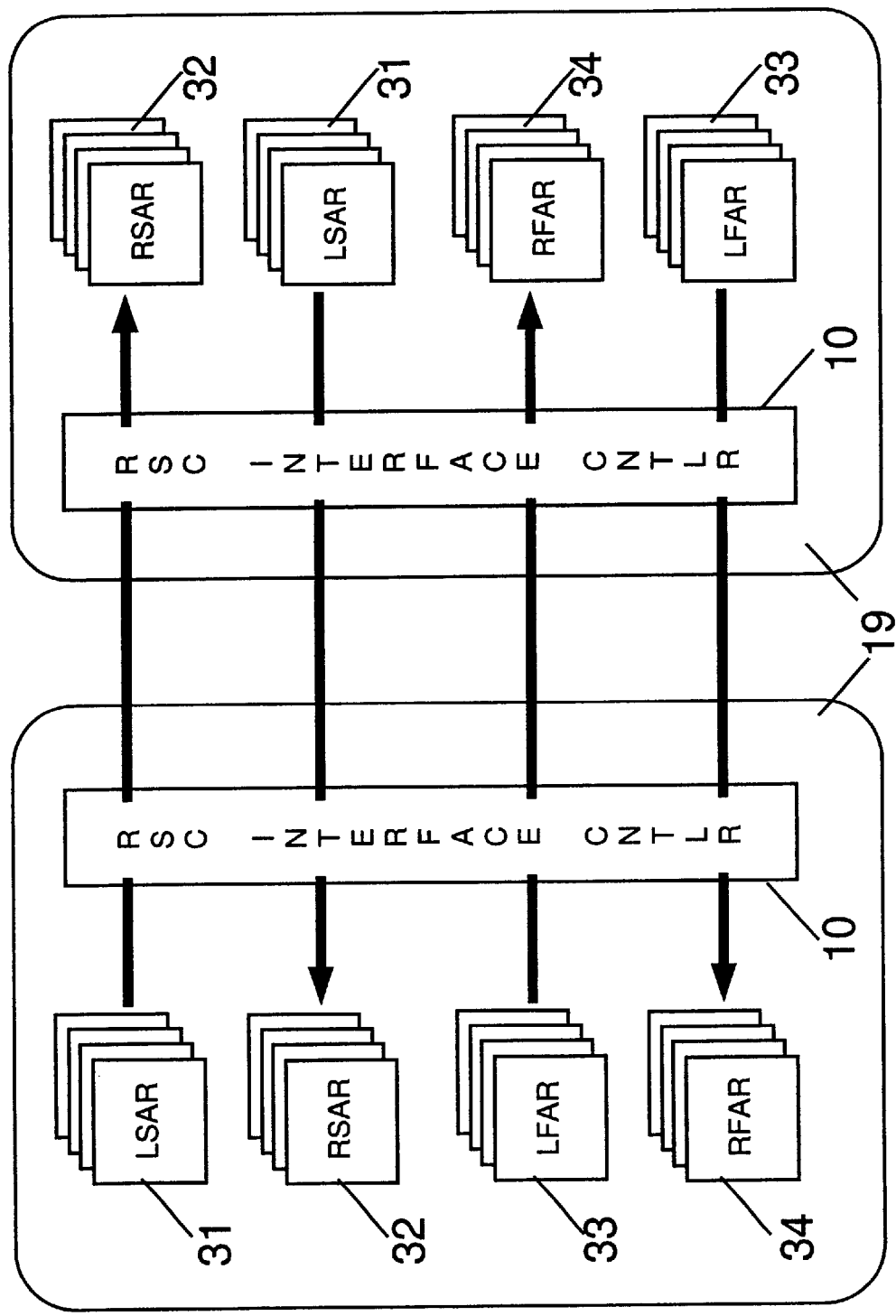

FIGURE 3B

| RSAR OPERATION | OPERATION LSAR IS PROCESSING | | | | |
|---|---|---|---|---|---|
| | LRU CAST OUT | STORE PAD | I/O STORE | MOVE PAGE STORE |
| LRU CAST OUT | IGNORE | IGNORE | IGNORE | IGNORE |
| STORE PHYSICAL ABSOLUTE | IGNORE | IGNORE | IGNORE | IGNORE |
| STORE PAD | WAIT | ABORT | IGNORE | ABORT |
| EXCLUSIVE INVALIDATE | WAIT | ABORT | IGNORE | ABORT |
| I/O STORE (including query) | WAIT | ABORT | IGNORE | ABORT |
| MOVE PAGE STORE | WAIT | ABORT | IGNORE | ABORT |

35

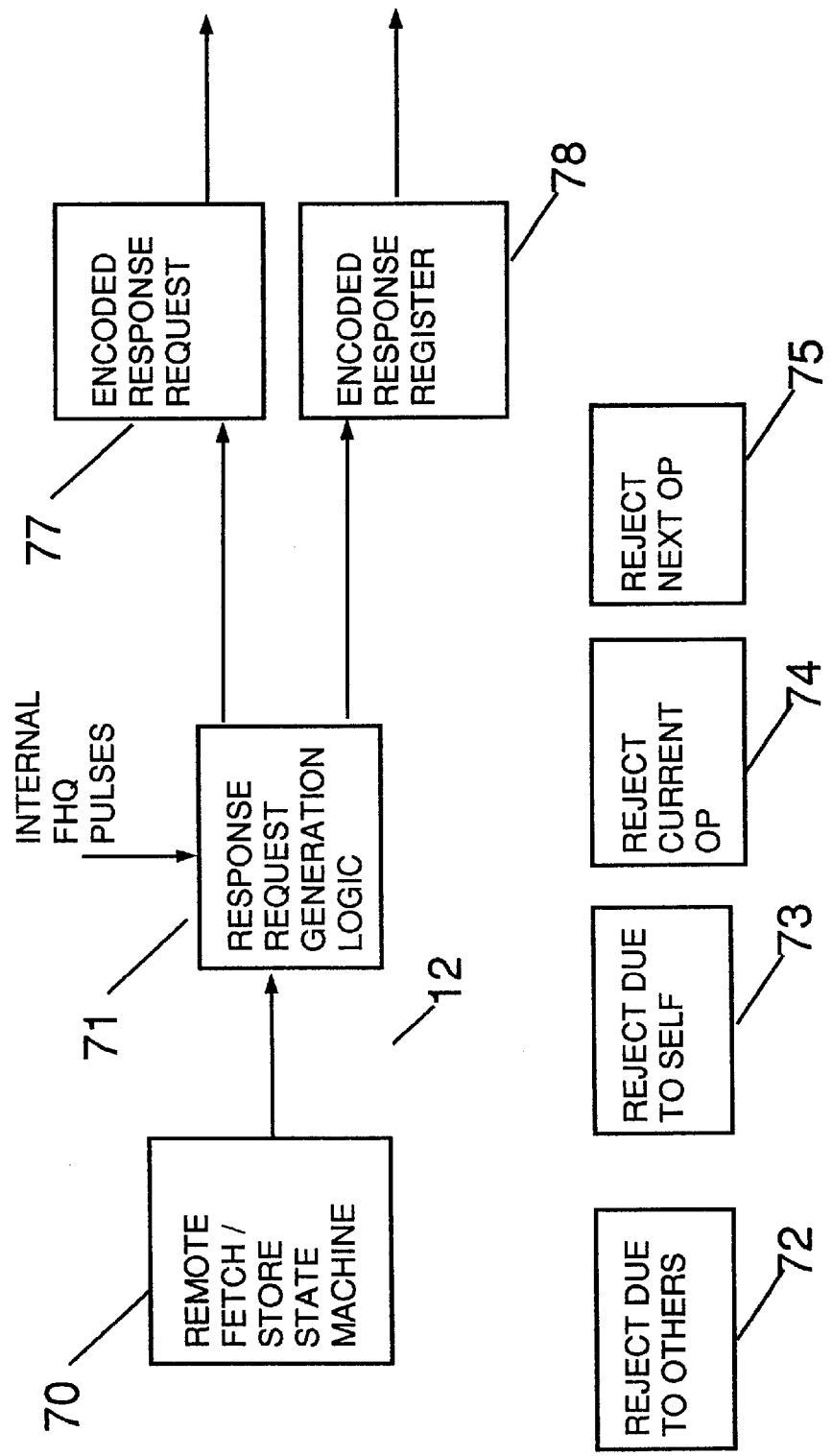

METHOD FOR DEADLOCK AVOIDANCE IN A CLUSTER ENVIRONMENT

RELATED APPLICATIONS

This application entitled "Method for deadlock avoidance in a cluster environment" is related to U.S. Ser. No. 09/745,593, filed Dec. 22, 2000, and entitled "High Speed Remote Storage Controller" and also to U.S. Ser. No. 09/747,686, filed Dec. 22, 2000, and entitled "Clustered Computer System with Deadlock Avoidance".

These co-pending applications and the present application are owned by one and the same assignee, International Business Machines Corporation of Armonk, N.Y.

The descriptions set forth in these co-pending applications are hereby incorporated into the present application by this reference.

Trademarks: S/390 and IBM are registered trademarks of International Business Machines Corporation, Armonk, N.Y., U.S.A. Other names such as z900, e(logo)Server may be registered trademarks or product names of International Business Machines Corporation or other companies.

FIELD OF THE INVENTION

This invention is related to computer systems and particularly depicts a method for deadlock avoidance among a plurality of clusters of symmetric multiprocessors (SMPs).

BACKGROUND OF THE INVENTION

Today's e-business environment places great demands on the computer systems that drive their infrastructure. This is especially true in the areas of system performance and availability due in large part to the increasing amount of data sharing and transaction processing inherent in large system applications. Another aspect of the e-business infrastructure is the unpredictability of the workloads which mandate the underlying computer systems to be highly scaleable. However, the importance of additional performance and scalability must always be tempered by the cost of the systems.

Historically system architects have used various means to achieve high performance in large tightly coupled symmetrical multiprocessor (SMP) computer systems. They range from coupling individual processors or processor clusters via a single shared system bus, to coupling processors together in a cluster, whereby the clusters communicate using a cluster-to-cluster interface, to a centrally interconnected network where parallel systems built around a large number (i.e. 32 to 1024) of processors are interconnected via a central switch (i.e. a crossbar switch).

The shared bus method usually provides the most cost efficient system design since a single bus protocol can service multiple types of resources. Furthermore, additional processors, clusters or peripheral devices can be attached economically to the bus to grow the system. However, in large systems the congestion on the system bus coupled with the arbitration overhead tends to degrade overall system performance and yield low SMP efficiency. These problems can be formidable for symmetric multiprocessor systems employing numerous processors, especially if they are running at frequencies that are two to four times faster than the supporting memory subsystem.

The centrally interconnected system usually offers the advantage of equal latency to shared resources for all processors in the system. In an ideal system, equal latency allows multiple applications, or parallel threads within an application, to be distributed among the available processors without any foreknowledge of the system structure or memory hierarchy. These types of systems are generally implemented using one or more large crossbar switches to route data between the processors and memory. The underlying design often translates into large pin packaging requirements and the need for expensive component packaging. In addition, it can be difficult to implement an effective shared cache structure.

The tightly coupled clustering method serves as the compromise solution. In this application, the term cluster refers to a collection of processors sharing a single main memory, and whereby any processor in the system can access any portion of the main memory, regardless of its affinity to a particular cluster. Unlike Non-Uniform Memory Access (NUMA) architectures, the clusters referred to in our examples utilize dedicated hardware to maintain data coherency between the memory and the hierarchical caches located within each cluster, thus presenting a unified single image to the software, void of any memory hierarchy or physical partitions such as memory bank interleaves. One advantage of these systems is that the tightly coupled nature of the processors within a cluster provides excellent performance when the data remains in close proximity to the processors that need it such as the case when data resides in a cluster's shared cache or the memory bank interleaves attached to that cluster. In addition, it usually leads to more cost-efficient packaging when compared to the large N-way crossbar switches found in the central interconnection systems. However, the clustering method can lead to poor performance if processors frequently require data from other clusters, and the ensuing latency is significant, or the bandwidth is inadequate.

The other important aspect of today's large systems is reliability and availability which is paramount in a web-based e-business. Thus, it's not uncommon for such systems to incorporate mechanisms to transfer workloads from a failing processor to another processor, take failing memory off line, and balance workloads among the clusters to ensure the systems are available 24 hours per day 7 days per week. However, in a multi-node system structure, the potential exists for multiple processors or I/O devices to simultaneously request the same block of data to be transferred between the clusters, which can lead to situations where resources on different clusters deadlock against each other, thereby hanging the system.

The use of clusters of microprocessors is a rapidly growing approach to providing unprecedented overall system performance. However, in symmetric multiprocessing (SMP) computer systems, where each processor has equal access to a single shared main memory, many techniques are used to improve system performance by reducing or hiding memory access latencies or maintaining a high degree of concurrent operations. Many times, these techniques create conditions which can result in a cross-cluster deadlock. Because this area is still relatively immature with respect to other areas of computer hardware design, most of the prior art fails to comparably address the same aspects taught by the present invention.

U.S. Pat. No. 6,073,182 entitled Method of Resolving Deadlocks Between Competing Requests in a Multiprocessor Using Global Hang Pulse Logic describes a method of deadlock avoidance using a single technique known as Fast Hang Quiesce. The method taught by the invention primarily targets the processor and I/O controllers within a single cluster (or node) of a the System Controller (SC) described in the preferred embodiment of the present invention. Our invention teaches several improvements regarding deadlock avoidance employing a plurality of techniques, one of which contemplates the embodiment of the art within our invention to expand its capability to cover cross-cluster deadlocks.

U.S. Pat. No. 5,224,100, entitled Routing Technique for a Hierarchical Interprocessor-Communication Network Between Massively-Parallel Processors, describes a routing technique for a massively parallel single instruction-multiple data (SIMD) multilevel hierarchical nodes arranged in clusters. Although this invention teaches a method of deadlock avoidance, it is achieved within a special purpose apparatus designed to perform the single task of transferring data packets from a source processor to a receiving processor. On the other hand, the present invention provides a means of deadlock avoidance in a complex SMP computer system which entails performing many type of operations such as concurrent data accesses from main memory, shared caches, I/O devices, etc. as well as memory storage accesses and cache coherency operations.

U.S. Pat. No. 4,754,398, entitled System for Multiprocessor Communication Using Local and Common Semaphore and Information Registers also teaches a method of deadlock detection, but it is limited to a single operation analogous to an I/O Test and Set operation in the present invention. The method described herein is achieved through the use of dedicated signaling among all the processors in the system. Such an implementation is not practical in the present invention since it employs a large system with 16 or more processors arranged in packages that preclude dedicated signaling between all of them. Furthermore, our invention employs deadlock methods to cover all types of fetch and store operations from processors and I/O devices.

SUMMARY OF THE INVENTION

The present invention describes various methods designed to avoid cross-cluster deadlocks. By utilizing a combination of design advances, including an optimized cache coherency scheme and the principles described in U.S. Pat. No. 6,038,651 entitled SMP Clusters with Remote Resource Management for Distributing Work to Other Clusters while Reducing Bus Traffic to a Minimum, our invention teaches various methods to proactively avoid deadlock situations as opposed to detecting the deadlock and employing some type of recovery scheme. These deadlocks become more frequent as the size and complexity of large systems increases, and often they require restarting the system, thereby decreasing productivity and/or availability.

The preferred embodiment is incorporated into an Symmetric Multiprocessing System comprising a plurality of Central Processors, each having a private L1 cache, a plurality of I/O Adapters, and a main memory wherein any Processor or I/O Adapter can access any portion of the memory. The total number of Processors and I/O Adapters are divided equally into two clusters. In addition, the main memory is comprised of banks or interleaves, half of which are attached to each cluster.

Within each cluster there exists a System Controller which consists of a system coherency management unit, cluster shared cache, various controllers, and discrete interfaces (or ports) to every Processor, I/O Adapter, and the main memory. The cache represented in the present embodiment is comprised of a plurality of banks or interleaves and the contents are managed by a 16-way associative directory. The System Controller depicted in FIG. 1 illustrates the major functional elements and will be described further in the detailed description of the preferred embodiment. However, a brief overview of the System Controller within a single cluster is beneficial in understanding the aspects of the present invention.

The primary function of the System Controller is to process data fetch and store requests coherently between the Processors and I/O Adapters and the system's main memory. Since the System Controller contains a shared cache, which is architecturally invisible to the software and operating system, the System Controller is also responsible for performing directory and cache accesses. All incoming requests enter a port on the System Controller, where they are received by a Central Processor (CFAR) or I/O Controller. These controllers generate requests into a Central Priority unit which arbitrates among them and chooses one of the requesters to enter into one of two multistage Pipelines based on the address. During each stage of the pipeline the requester accesses and/or reserves various resources such as the cache, the Local Cache Fetch/Store Controllers, the data path controls, data path FIFO buffers, the Remote Fetch/Store Controllers, etc.

Directory accesses are made to determine the state of the requested block of data. Requests exiting the pipeline that miss the local cache become the responsibility of one of the Local Fetch/Store Controllers. These controllers manage the subsequent fetch and store operations that must be dispatched to the remote nodes and/or main memory. Often this requires additional passes through the pipeline, therefore a Local Fetch/Store Controller must also participate in Central Priority arbitration, and is also considered a requester. In the present embodiment, we include the Cache Controller and the Main Memory Controller, as part of the Local Fetch/Store Controllers, Between them they contain all the resources (including data path elements such as FIFO buffers and cross point switches) necessary to access data from the cache interleaves, process data accesses to main memory when cache misses occur, perform store operations into the cache interleaves, and cast out aged data (using a Least Recently Used method) from the cache into main memory in order to make room for incoming data from main memory accesses.

As stated above, the main memory banks are physically distributed between the two clusters of the BI-nodal system. However, the main memory appears as a single unified entity to any of the Processors or I/O Adapters located anywhere in the SMP system. Therefore, the present embodiment incorporates an additional set of controllers, known as Remote Fetch/Store Controllers. The System Controller keeps track of which main memory addresses are assigned to the memory banks on each cluster. Whenever data accesses (fetch requests) miss the cache on the local cluster, (where the term local refers to the cluster to which the originating Processor or I/O Adapter is attached), the Local Fetch/Store Controller must interrogate the remote (or "other") cluster to see if the data resides in that cache. These remote interrogations are processed by the Remote Fetch Controllers, which make requests into Central Priority and access resources in a similar fashion to the Local Fetch/Store Controllers.

In addition, if the data access misses the remote cache, but the address denotes that it belongs to a memory bank attached to the remote cluster, the Remote Fetch/Store Controller also interacts with the Main Memory Controller to initiate main memory accesses. For operations which necessitate storing data into memory (such as casting aged data out of the cache), the address once again determines whether the Local Fetch/Store Controller can process the entire operation or if a remote store operation must be initiated across the BI-nodal interface. In this situation, the remote store operations are processed by the Remote Store Controller who also interacts with the Main Memory Controller to store the data into the memory interleaves. As with the Local Fetch/Store Controllers, their remote counterparts also contain all the resources (including data paths, FIFO buffers, and cross point switches) necessary to process inter-cluster operations.

The present invention also interacts with a remote management system for managing the resources comprising the aforementioned Remote Fetch/Store Controllers, and to distribute work to these Remote Fetch/Store Controllers, who in turn, act as agents to perform the desired operation without requiring knowledge of the requester who initiated the work request. Work is distributed only when a remote resource is available for processing the work, without a need for constant communication between multiple clusters of symmetric multiprocessors. These operations are initiated via a command interface and completion or error conditions are reported back on a response bus. Also in the preferred embodiment, the Local and Remote Fetch Controllers rely on a special synchronous XI response bus to indicate whether data hits or misses in the remote cache on a fixed number of cycles after the command is sent across the interface.

The present invention focuses on cross cluster deadlock avoidance while maintaining system level data coherency and a high level of system performance. The techniques described herein enable a multitude of operations to occur in a concurrent and high speed manner using a minimal number of external control signals.

In a non blocking switch design, such as the IBM eServer Z-Series, where multiple concurrent operations are allowed for improved system throughput, special care must be taken to maintain data coherency. Data integrity is compromised when operations to the same storage data are allowed to overrun, resulting in misplacement of true data and also bad ownership assignments. Prior generations of S/390 Enterprise Server designs have avoided this problem by employing a series of varied address comparators that are observed by each operation as it processes through the centralized multistage pipeline. Specifically, these address compares protect against concurrent conflicting data access by multiple requesters. They also protect data in transit between clusters and between cache and main memory.

In Bi-Nodal SMP designs, such as the S/390 enterprise server generation 5 design, some of the requesters are attached to one node and begin processing on this node while the remaining requesters are attached to the other node. When a request from one node requires an operation to be sent to the other node (such as a Main Storage data fetch or store), the operation is loaded into a Remote Fetch (a.k.a. RFAR) or Remote Store (a.k.a. RSAR) resource on the other node. This operation may conflict with an operation started by a requester local to the same node. Therefore a special set of address comparators involving these RFAR and RSAR resources needs to be implemented to prevent concurrent operation of a Remote operation with a Local operation.

These set of address comparators may result in the creation of system deadlock scenarios where multiple operations are all stuck waiting for each other to complete. Contributing to this problem is a local operation in one node may require a corresponding remote operation in the other node to complete before it is able to complete. For example, a local operation on cluster A could be stuck waiting for a remote operation in cluster B to complete an operation on it's behalf, but the remote operation in cluster B is stuck waiting for a local operation in cluster B to complete due to an address compare interlock. The cluster B local operation could be stuck waiting for a cluster A remote operation to complete on it's behalf, but the cluster A remote operation is stuck waiting for the cluster A local operation to complete due to an address compare interlock. The result is a deadlock where neither of the local operations can complete, eventually resulting in a system hang.

This disclosure identifies techniques implemented to avoid specific cross-nodal deadlock cases caused by the existence of these address compare interlocks while still maintaining the required data consistency.

The present invention employs a combination of address compare interlocks and cache management methods to detect potential cross-cluster deadlocks and circumvent them, while maintaining data integrity across a plurality of processor clusters. As previously described, a deadlock occurs when a resource is stuck waiting for another resource, which is waiting for another resource, and so on. Typically these resources can't progress through their operational sequences because they've encountered an address compare interlock against another resource. One would surmise that the easiest way to circumvent deadlocks is to simply ignore these interlocks and allow the operation to proceed.

However, these interlocks are required to maintain coherency. The following examples illustrate our method for safely ignoring interlocks while still maintaining proper data integrity.

In order to understand the following examples, one must first understand that the preferred embodiment resides in a computer processing system comprised of a plurality of clusters, wherein each cluster contains connections to a multitude of processors, connections to a multitude of I/O processors, connections to a shared main memory, a shared cache, one or more centralized pipelines for serializing storage and resource accesses, and an interface between the clusters known as the Remote Storage Cluster (RSC) interface. Also contained within a storage cluster is a plurality of requesters with the following functions:

LFAR: Used to manage fetch requests to main memory on the local cluster and initiate fetch requests to the remote cluster LSAR: Used to manage store requests to main memory on the local cluster and initiate store requests to the remote cluster RFAR: Used to manage fetch requests initiated by a corresponding LFAR from the other cluster. RFAR performs the fetch operation on behalf of the remote LFAR and returns the data to said LFAR across the RSC interface.

RSAR: Used to manage store requests initiated by a corresponding LSAR from the other cluster. RSAR performs the store operation on behalf of the remote LSAR and accepts the data from said LSAR across the RSC interface.

Note: In addition to data fetches and stores, all of these resources also perform various directory update operations.

A explanation of the following operations may be beneficial in understanding the mechanics behind the present invention's deadlock avoidance methods. The LFAR, LSAR, RFAR and RSAR controllers typically process:

Data Fetches from main memory or a cache.

Directory Invalidations which invalidate the block of storage in the cache and can be the Read-Only type (RO INV) that broadcasts to the central processor to invalidate their read-only copies of the block of data. These are typically the result of a processor requesting exclusive ownership of the block of data.

the Exclusive type (EX INV) that broadcasts to the central processor to relinquish ownership of their copy of the data and write any modifications to the data back into the cache LRU Cast Outs to store "aged" modified cache data into main memory Store Physical Absolute to store data sent from a central processor directly into a main memory location, bypassing the cache hierarchy Store Pad to replicate a data pattern dictated by a central processor into a main memory location.

Move Page Operations which consist of a Fetch and Store designed to relocate a page of storage from a source main memory (fetch) address to a target main memory (store) address I/O Store to store 128 or 256 bytes of I/O data into a main memory location or directly into the shared L2 cache if the data is already resident in the cache.

The present invention classifies system operations into three types of potential deadlocks, and employs a different method for avoiding each type. In all three cases, it is presumed that the requesters are vying for the same block of data, thus triggering an address compare situation. In addition, our invention also incorporates a fourth method of deadlock avoidance known as Fast Hang Quiesce which is not based on address compares, and is designed to recover from any hang situations which could result from either unresolved deadlocks or hardware failures.

RFAR vs. RFAR:

These situations involve an LFAR on each cluster sending either a data fetch request or read-only directory invalidation to the corresponding RFAR on the other side. In addition, both operations are vying for data belonging to the same line. The potential for a deadlock exists because the LFAR on cluster A is waiting for its corresponding RFAR on cluster B. The RFAR on cluster B encounters a compare against the LFAR on cluster B, who is waiting for its RFAR on cluster A. The RFAR on cluster A sees a compare against the LFAR on cluster A. Thus, neither of the four resources can progress. In this case, our invention employs an address-based mechanism which indicates whether the request is targeting main memory (PMA) on a local or remote node. This bit, also known as the local PMA bit, ultimately determines which of the remote fetches will be permitted to continue.

The aforementioned scenario assumes complete overlap of the two fetch requests. One can appreciate how these requests can be skewed in such a way that data is already being transferred, or a main memory request has already been issued, before the second request is loaded into the RFAR. Our invention contemplates this situation and employs a signaling technique between the LFARs and RFARs on the same cluster to indicate when a data return is eminent. If an RFAR compares against an LFAR whose data return is eminent, it must honor its compare, regardless of the local PMA bit.

Another aspect of our invention is revealed when one or more of the RFARs on each node are processing a read-only directory invalidation. The operation results from a processor on the remote node requesting the data exclusively, with the data potentially existing read-only in both caches. The end result of this operation is for read-only XIs to be broadcast to all the CPs on the remote side, the remote cache to be invalidated, and the processor on the local side to own the data exclusively. In order to ensure the cache coherency is maintained, the RFAR which has to honor its compare always completes the operation by returning a reject response to the other side. This ensures the LFAR on the other side will return the request to be recycled through the central pipeline, thereby ensuring the initial requester will see the correct directory state.

RFAR vs. RSAR

These situations involve an LFAR on one cluster sending either a data fetch request or read-only directory invalidation to the corresponding RFAR on the other side. Meanwhile an LSAR on the other cluster initiates an operation to its corresponding RSAR on the first cluster. In addition, both operations are vying for data belonging to the same line. The potential for a deadlock exists because the LFAR on cluster A is waiting for its corresponding RFAR on cluster B. The RFAR on cluster B encounters a compare against the LSAR on cluster B, who is waiting for its RSAR on cluster A. The RSAR on cluster A sees a compare against the LFAR on cluster A. Thus, none of the four requesters can progress. In the general case, our invention requires an RFAR that encounters a compare against an LSAR to honor the compare and wait for the LSAR to complete. Additionally, the RSAR on the other side will ignore its compare against the LFAR and complete the operation. Upon returning its response to the corresponding LSAR on the other side, the RFAR on the other side will be able to proceed with its operation. Unlike the RFAR vs. RFAR scenarios, the RFAR in this situation can encounter a directory miss during a subsequent pipe pass after detecting the LSAR compare. This can occur due to the LSAR performing a directory invalidation as part of an operation such as a Store Pad or LRU Cast Out. Normally, if the LSAR operation targets the remote side, the RFAR will terminate by sending back a "miss" final response.

Just as in the previous category, the same exception applies concerning returning data. The LSARs and RSARs within a cluster employ the same signaling technique previously described to indicate when a data return is eminent. If an RSAR encounters a compare and a data return is eminent, it must honor the compare and wait for the LFAR to complete. Also, just as described in the previous category, if the RFAR is processing a read-only invalidate, it will return a reject response to force the initial requester to recycle the request.

RSAR vs. RSAR

These situations involve an LSAR on each cluster initiating an operation to the corresponding RSAR on the other side. In addition, both operations are vying for data belonging to the same line. The potential for a deadlock exists because the LSAR on cluster A is waiting for its corresponding RSAR on cluster B. The RSAR on cluster B encounters a compare against the LSAR on cluster B, who is waiting for its RSAR on cluster A. The RSAR on cluster A sees a compare against the LSAR on cluster A. Thus, none of the four resources can progress. Due to the number of different operations the RSAR in the preferred embodiment can process, the method used to avoid the deadlock is command dependent.

To begin with, the preferred embodiment contemplates the use of a cache management scheme which guarantees that remote LRU cast outs will always miss the remote cache. Therefore, to improve performance, RSAR processes LRU cast outs in an asynchronous fashion and bypasses the centralized pipeline. Since these LRU operations don't require RSAR to perform any cache coherency tasks, our invention allows any RSAR processing them commands to automatically ignore any interlocks it encounters.

Secondly, an RSAR in the present invention will ignore a compare against an LSAR if the LSAR is processing an I/O Store or I/O Query operation targeting that cluster. This is permitted because architecturally I/O Stores are not guaranteed in any specific order or relationship to other operations in the system. For example, if RSAR is processing a Store Pad, it is allowed to proceed with the main memory store operation while the local LSAR is also processing an I/O Store. Cache coherency is maintained in the following manner. For a compare to occur, the RSAR operation must be targeting the same cluster as the I/O Store. Furthermore, LSAR is only loaded with an I/O Store if it misses the local cache. In order to maintain coherency, the local LSAR must query the remote cache to see if the line exists there. If the query is sent after the remote side has initiated the RSAR operation, the query will encounter a compare against the LSAR on the other cluster and wait. This ensures the RSAR operation on the local cluster completes first and performs all necessary directory updates prior to allowing the I/O Store to continue. On the other hand, if the query completes before the RSAR operation initiates, or if the query indicates a miss in the remote cache, then the I/O Store proceeds out to the local main memory and an architecturally permissible race condition ensues.

In addition to the aforementioned case, RSAR can also safely ignore compares when the local LSAR is processing a Store Pad or Move Page Storage op and RSAR is processing any operation. Furthermore, if RSAR is processing something other than a remote LRU cast out, our invention employs an additional performance enhancement by actually aborting the operation. Thus, rather than spend time transferring data to main memory or making directory update pipe passes, RSAR simply returns a completion response as if the operation occurred. This results in significant performance improvements in systems comprising extensive memory latency or constricted memory bandwidth in comparison to processor performance. Once again, this is permissible since S/390 system architecture allows Store Pads and Move Page Store operations to be processed without order.

The final case dictates the conditions requiring RSAR to honor any compare it encounters. These cases occur when the local LSAR is processing an LRU cast out and RSAR is processing any operation other than a remote LRU cast out. Since the LSAR is processing a cast out, it must either target the local or remote side. If it targets the local side, a deadlock is not possible because the RSAR will simply honor the compare and wait for the cast out to complete. On the other hand, if the LSAR cast out targets the remote side, it will load the RSAR on the other side. However, our invention avoids any potential deadlock by allowing the remote cast out to complete asynchronously, thereby bypassing any interlocks.

Generation of Rejects Responses by RFAR or RSAR

The present invention further improves upon prior art by enlisting a form of active and passive hang detection within the Remote Fetch and Store Controllers. The RFAR and RSAR controllers work in a passive manner to achieve deadlock avoidance by forcing a reject response when the existence of a fast hang quiesce (fhq) condition emanating from elsewhere in the SC has been detected. Additionally, the present invention also permits the RFAR and RSAR controllers to actively participate in the generation of a fast hang quiesce condition to be broadcast to other controllers in the SC. This is achieved through the use of a Global Hang Counter in the SC which generates the fhq pulses that are used to monitor progress through the SC. Each SC controller (including RFAR and RSAR) activates its own internal hang pulse when the number of fhq pulses it receives reaches a predetermined count known as the internal hang limit. If two consecutive internal hang pulses are generated, it's indicative of a potential hang condition. The controller responds by activating its fhq request latch which results in the broadcast of the fhq condition to all SC controllers. The newly activated fhq condition results in all subsequent requests being forced temporarily inactive (i.e. quiesced) in order to allow all currently active operations to complete. If RFAR or RSAR detects the fhq active condition during a valid operation, then that RFAR or RSAR operation will be rejected. This improves the probability of completing all currently active SC operations since the RFAR or RSAR reject results in the removal of any possible interlock conditions than any other SC requester may have had with RFAR or RSAR.

Although the internal functionality of the central SC Fast Hang Quiesce mechanism is largely unchanged from that cited in the Prior Art as U.S. Pat. No. 6,073,182, the present invention expands the use of this mechanism to include the remote facilities. In doing so, some care must be exercised to ensure that the RFAR/RSAR reject due to fhq mechanism itself does not result in any hardware loop or deadlock conditions. For this reason, activation of this mechanism is dynamically blocked if any of the following conditions are true;

1. The RFAR or RSAR is already in the process of generating a response.
2. A reject response for this RFAR or RSAR has already been issued during this quiesce period.
3. The RFAR or RSAR is in one of the following states:
   a. The internal state machine is not in the initial state
   b. The internal state machine is in the initial state, it hasn't encountered any compare and it's not currently waiting for any resources.

In addition, the following mode and disable switches are implemented for maximum flexibility:

1. Reject current op: Results in reject response for current RFAR or RSAR op assuming none of the blocking conditions described above are active.
2. Reject next fetch: Results in reject response for next RFAR op (instead of current RFAR op) assuming none of the blocking conditions described above are active.
3. Disable reject due to self: Blocks forcing of reject response if this RFAR or RSAR initiates fhq request.
4. Disable reject due to others: Blocks forcing of reject response if a requester other than this RFAR or RSAR initiated the fhq request.

The present invention improves upon prior implementations of S/390 Enterprise Servers in several aspects. To begin with, the S/390 G5 and G6 Enterprise Servers contain more Local Fetch/Store Address Registers (LFAR/LSAR) than Remote Fetch/Store Address Registers (RFAR/RSAR). In addition, the RFAR/RSARs are floating and can service any LFAR/LSAR on the remote cluster. This imbalance increases the likelihood of a cross-cluster deadlock due to the inability of the RFAR/RSAR resources to service all the LFAR/LSARs simultaneously. Our invention utilizes an equal number of LFAR/RFAR and LSAR/RSAR pairs, and also incorporates a fixed affinity between each LFAR/RFAR and LSAR/RSAR. This ensures that each LFAR/LSAR operation in need of a remote resource, will be guaranteed to have one available, thus reducing the chances of encountering deadlocks while improving performance.

Another innovation of our invention is the use of an I/O Query followed by an remote I/O Store, if necessary. Previous binodal systems required all I/O Stores to be performed to the local side. Therefore, a special remote force cast out command was issued to the remote cluster to test if the line existed in that cache. If so, the RSAR on the remote side would enlist an LSAR on the remote side to perform a cast out of the data back to the local side. The entire operation utilized four resources:

- the local LSAR initiating the force cast out
- the remote RSAR servicing the force cast out
- the remote LSAR which the remote RSAR enlisted to perform the cast out
- the local RSAR which received and processed the force cast out data The present invention always only utilizes a single LSAR/RSAR pair to perform any remote operation, further eliminating the potential for cross-cluster deadlocks.

A further improvement over prior S/390 systems is the use of an abort mechanism within RSAR to detect when an RSAR operation can be architecturally thrown away. This feature not only aids in deadlock avoidance, but improves performance as well since costly memory accesses are spared.

In comparison to non-S/390 systems, one common approach in other systems is to reject operations back to the requester if resource or address conflicts arise. In addition to degrading overall system performance this approach often incites additional cross interrogation or "bus snooping" traffic. The present invention minimizes rejections to only those cases where the line has changed global state in the cache.

Lastly, our invention employs a fast hang quiesce mechanism within both RFAR and RSAR to detect system hangs and reject their current operation. This differs from prior systems in two respects. First, systems such as the G5 & G6 relied on the other SC resources (CFAR, CSAR, MAR, LFAR, LSAR, etc.) to detect system hangs and recycle their operation, whereas our invention embeds the detection logic within the remote controllers. Second and most importantly, fast hang quiesce was the only means of deadlock prevention in prior systems, whereas our invention uses it as a last resort in the event a deadlock occurs. In other words, the present invention takes a proactive approach in an effort to avoid deadlocks altogether while prior art tends to focus on resolving the deadlock in a reactionary manner.

Although the present invention is being described in association with the present preferred embodiment, one skilled in the art will appreciate that the concepts disclosed herein are applicable to systems comprising more than two clusters, and utilizing Storage Clusters differing from our present embodiment. Additionally, the present invention contemplates alternate System Controller embodiments with a different number and configuration of functional units, including, but not limited to, the cache structure, the main memory organization, the number and size of data path resources (such as buffers, control busses, etc.), the composition of the various controllers, and the number and size of the Pipelines.

These and other improvements are set forth in the following detailed description. For a better understanding of the invention with advantages and features, refer to the description and to the drawings.

BRIEF DESCRIPTION OF THE DRAWINGS

FIGS. 2A through 2I illustrate the various combinations of cross cluster operations than can lead to deadlocks.

FIG. 3A show the affinity between the local and remote controllers

FIG. 3B depicts the store operation abort mechanism

FIG. 7 illustrates the internal Fast Hang Quiesce logic with the Remote Fetch and Store Controllers Our detailed description explains the preferred embodiments of our invention, together with advantages and features, by way of example with reference to the drawings.

DETAILED DESCRIPTION OF THE INVENTION

Figure 1:
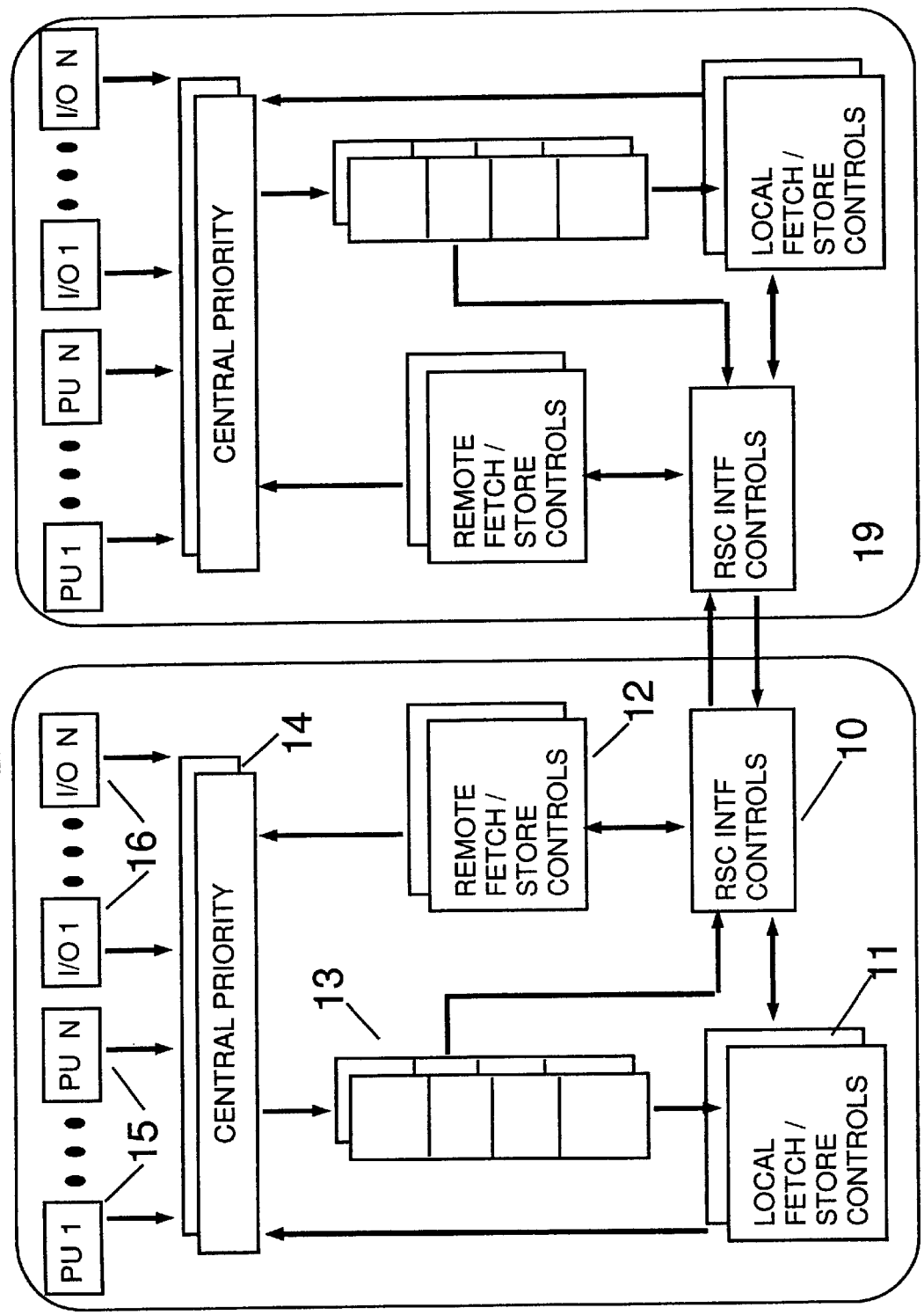
FIG. 1 depicts a BI-nodal System Controller in a symmetric multiprocessor system.

FIG. 1 depicts two clusters in a BI-nodal symmetric multiprocessor system, each of which contains a System Controller. The Remote Storage Cluster Interface Controller (RSC IC 10) interacts with a plurality of Local Fetch/Store Controllers (11), Remote Fetch Controller (12A), the Remote Store Controller (the present invention 12B), and Centralized Multistage Pipelines (13). These Pipelines are fed by a Central Priority (14) Station which prioritizes asynchronous work requests emanating from N Central Processing Unit Controllers (15) or N I/O Adapters Controllers (16). Each CPU Controller has an affinity to a particular Central Processor (CPU) in the SMP system. The Pipelines comprise a shared Level 2 store-in cache to which all Central Processing Units, I/O adapters and Local and Remote Fetch/Store Controllers have read and write access. The cache coherency operation employed in the preferred embodiment permits data to reside in the cache in a read-only state which permits all processors and I/O adapters on both clusters to access copies of the data, or an exclusive ownership state whereby a single processor can exclusively own the data at any time. Any processor on any cluster may request ownership of data at any time, even if another processor currently owns that data.

Within the Local (11) and Remote (12A and 12B) Fetch/Store Controllers are dedicated controllers for managing fetch and store operations. The Local Fetch Controller works in conjunction with the Remote Fetch Controller (12A) to initiate and manage data fetches from anywhere in the system. Conversely, the Local Store Controller initiates store requests to any memory location in the system. In cases where the request targets the memory or cache on the local cluster, the Local Store Controller manages the entire operation. However, when the request targets a memory location on a remote cluster, the Local Store Controller initiates a request to the present invention (12B) which acts on behalf of the Local Store Controller to store the data in a most efficient manner.

The preferred embodiment utilizes a dual pipeline design in which the Central Pipelines (13), Remote Fetch/Store Controllers (12A and 12B) and Local Fetch/Store Controllers (11) are all duplicated. The concepts disclosed in the present invention are independent of the surrounding structure of the System Controller (SC) and can be just as effectively implemented in a more traditional single pipeline SC design or a less traditional SC design employing three or more pipelines. One skilled in the art will appreciate how the Remote Fetch/Store Controller interfaces and internal functional blocks can be easily scaled to adapt to almost any SC structure.

Like much of the existing art, the present invention relies on address interlocks to determine whether multiple requesters are contending for the same block of storage. The primary purpose of these interlocks is to sequentialize the requesters to ensure only one operates on the storage block at a time. Each controller shown in FIG. 1 employs a compare station to monitor the Central Pipeline (13) and upon detecting a compare, classifies it as one of the following types:

those which can be recycled back into the Centralized Pipeline once the compare clears those which can be safely ignored those in which the associated operation can be aborted those in which the operation is rejected to the originating cluster By classifying each type of address compare in this manner, the present invention not only permits certain operations to continue processing, or at least waiting a reduced amount of time, but it plays a key role in the methods for cross-cluster deadlock avoidance.

The Remote Storage Controller (12B) has several subunits which interact with various SC functional units. Since there is only a single Remote Storage Cluster interface to service requests from twin sets of Pipelines (13) and Fetch/Store Controllers (11, 12), the solitary RSC IC has to accommodate a multitude of local interfaces as well as the cluster-to-cluster interface. In addition, it has to manage traffic flowing from the local cluster to the remote cluster as well as traffic flowing from the remote cluster.

FIGS. 2A through 2F depict six operational scenarios that can result in cross cluster deadlocks. The present invention teaches deadlock avoidance by implementing logic which is designed to detect these scenarios and take proactive measures to prevent the deadlock from ensuing. Before explaining how the present invention handles each scenario, it may be beneficial to illustrate how a cross cluster deadlock forms.

Figure 2A:
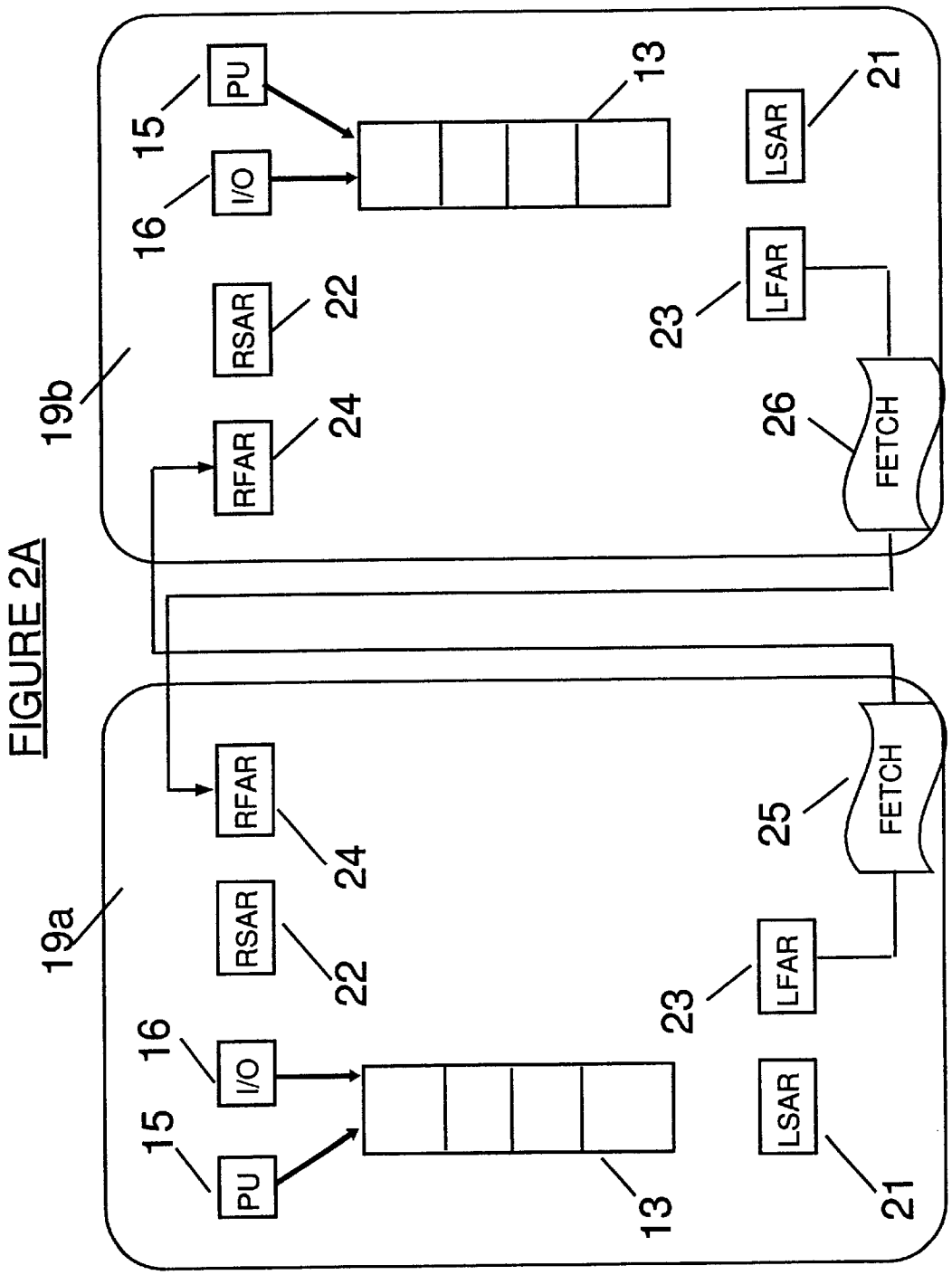

Turning our attention to FIG. 2A, two System Controller clusters (19a and 19b) are shown. For purposes of this discussion, the left cluster (19a) will be referred to as the "local" cluster and the right (19b) as the "remote" cluster. Within each cluster there exists a plurality of processor controllers (15), I/O controllers (16), a multistage Centralized Pipeline (13), Local Store Controllers (LSAR 21), Remote Store Controllers (RSAR 22), Local Fetch Controllers (LFAR 23) and Remote Fetch Controllers (RFAR 24). It should be noted that just because one cluster is denoted the "local" cluster and one is the "remote" cluster, all clusters in the preferred embodiment always contain a set of Local Controllers for handling operations initiated on that cluster and a set of Remote Controllers for processing operations on behalf of the associated Local Controllers.

Also included in FIG. 2A are a Local Command (25) and Remote Command (26). These represent the various operations that can be processed by RFAR and RSAR on behalf of a corresponding LFAR and LSAR. The LFARs operations typically involve read-only or exclusive data fetches and Read Only Directory Invalidations which are a result of the processor on that LFAR's cluster requesting a block of data in an exclusive state. The LSAR operations are LRU Cast Outs, Store Pads (which replicate processor initiated data patterns directly into main memory), Exclusive Directory Invalidations, Move Page Stores (which store data fetched from one portion of main memory into a target main memory address), I/O Stores and Store Physical Absolutes (which update main memory with a block of data storage while omitting any cache coherency operations).

An example of a cross cluster deadlock occurs if the local LFAR initiates an operation which requires the corresponding RFAR on the remote cluster. Simultaneously, the remote LFAR initiates an operation which requires the correspond RFAR on the local cluster. If both operations pertain to the same block of storage, then the address interlocking within each of the four controllers would activate and pause that controller's progress until the compare clears. However, since each controller is dependent on one of the other three to progress, none will progress so the address compares will never release. Hence a deadlock forms since all four requesters are stuck waiting for each other.

Returning to FIG. 2A, the Local Command (25) being initiated is some type of data fetch while the Remote Command (26) being initiated is also a data fetch. The present invention avoids the deadlock by using an arbitrary address bit known as the "local memory" bit to break the impending deadlock. Essentially this bit is examined by the RFARs on each cluster. Since both sides are targeting the same memory location, the memory can only be "local" to one of the RFARs. In this example, we will presume that the memory address targets the "local" cluster (19a). By definition, the RFAR considered to be "remote", (the RFAR on cluster 19b) is allowed to ignore the compare, and proceed. The directory is interrogated and if data resides in the cache it is returned, otherwise an XI "miss" response is returned. Meanwhile, the RFAR on local cluster 19a must honor its compare so it returns an automatic "hit" interrogation response. This serves the purpose of "freezing" the LFAR on the cluster 19b and preventing it from making a fetch request to main memory. The RFAR on cluster 19a then waits for the local LFAR to receive the data it requested from cluster 19b. In the event that the remote RFAR missed the cache, the local LFAR on cluster 19a will forward a fetch request to the local main memory and acquire the data. Regardless of the data source, as soon as the LFAR on cluster 19a loads the data into the local cache, the local RFAR's compare will release, its request will recycle back into the Central Pipeline (13) and it will fetch its data from the local cache.

The aforementioned scenario assumes complete overlap of the two fetch requests. One can appreciate how these requests can be skewed in such a way that data is already being transferred, or a main memory request has already been issued, before the second request loaded into the RFAR. Our invention contemplates this situation and employs a signaling technique between the LFARs and RFARs on the same cluster to indicate when a data return is eminent. If an RFAR compares against an LFAR whose data return is eminent, the present invention asserts that it must honor its compare, regardless of the local memory bit. Once the data is returned and loaded into the cache, the LFAR completes, and the address interlock releases, thus allowing the neighboring RFAR to proceed. Since the data can only be sourced from one main memory location, this eminent data return can only occur on one cluster at any given time.

Figure 2B:
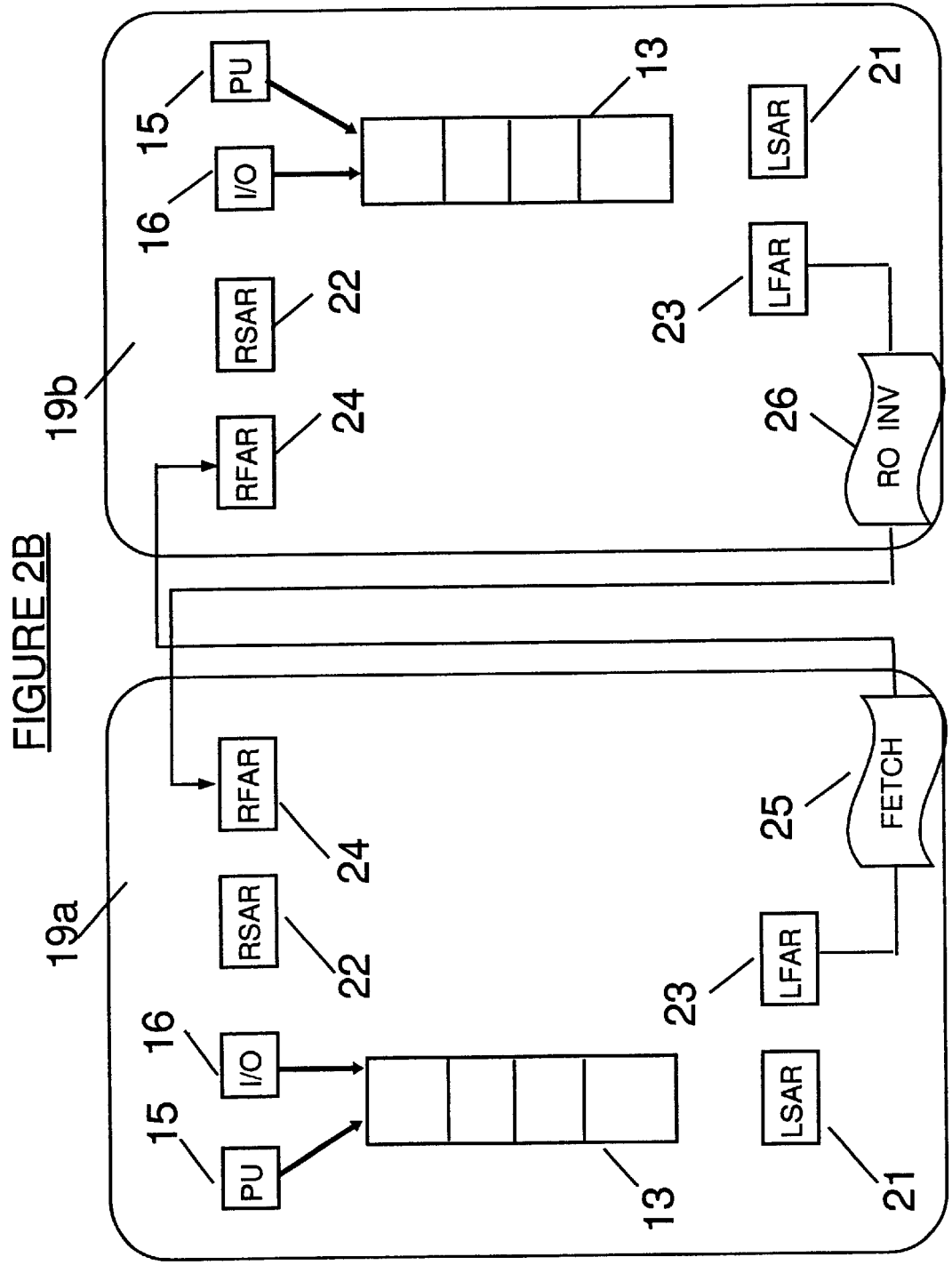

FIG. 2B illustrates cluster 19a issuing a data fetch as the Local Command (25) while the Remote Command (26) is a Read-Only Invalidate. Once again, the "local memory" bit determines which RFAR will honor its interlock and which will be allowed to proceed. In this example, the target memory address is on cluster 19*a*, so the RFAR (24) on cluster 19*a* must wait. Meanwhile the RFAR (24) on cluster 19*b* may proceed with its data fetch and return the data to cluster 19*a*. Upon completing the data fetch, the RFAR on cluster 19*a* proceeds with the Read-Only Invalidate and after invalidating the directory, returns a reject response. The reject response is necessary because the data fetch on cluster 19*b* may have updated the directory state to reflect an invalid entry or a read-only state to a different processor(s). The reject response forces the originating processor controller to reexamine the directory state and perform all the necessary cache coherency activities to ensure the requesting processor on cluster A acquires proper exclusive ownership.

If the target memory address is on the remote cluster the deadlock avoidance technique is nearly identical. In this situation, the data fetch would have to honor the compare and the Read-Only Invalidate would be allowed to proceed. The one exception is if the data fetch has already begun transferring the data back to cluster 19*a*, then the same signal described earlier to indicate an eminent data return is again used to pause the Read-Only Invalidate until the data return is complete. However, if the data has not yet arrived on cluster 19*a*, then the Read-Only Invalidate would continue and the data fetch would wait.

Figure 2C:
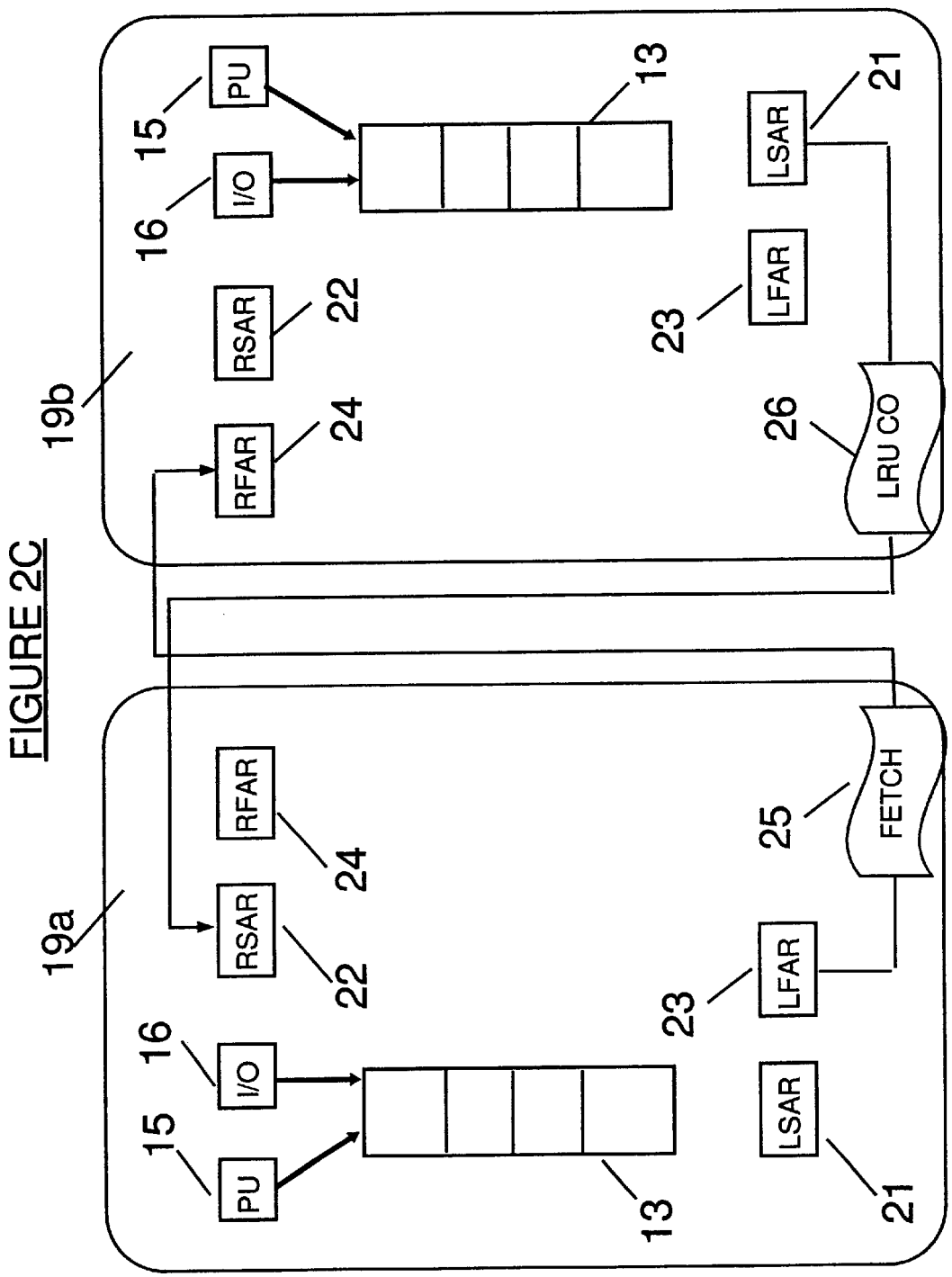

In FIG. 2C the Local Command (25) is some type of data fetch and the Remote Command (26) is an LRU Cast Out. Since the LRU Cast Out can only target the memory on one node (in this case the memory attached to local cluster 19*a*) our invention prevents the deadlock by always allowing the LRU operation to complete while making all other operations wait. Thus the local RSAR (22) on cluster 19*a* ignores the compare against LFAR and completes the data transfer to memory. On the remote cluster RFAR (24) returns a "false hit" over the synchronous XI response bus. The purpose of this false hit is to freeze the local LFAR on cluster 19*a* by indicating the fetch data may be coming from the remote cache. This prevents the LFAR from initiating a data fetch to the local memory. Meanwhile, RFAR on cluster 19*b* waits until the LSAR on cluster 19*b* is finished with the LRU, at which time the storage block will be invalidated out of the remote cache. Upon resuming, RFAR will report a cache miss back to the LFAR (23) on cluster 19*a*. This results in LFAR on the local cluster fetching the data locally and obtaining the most recent copy of the data.

A key improvement in this scenario is the use of a final miss response after the LRU completes. An alternate implementation would have the RFAR generate a reject response, which would result in the LFAR rejecting the operation back to the original requester (CP or I/O). Although this maintains the proper cache coherency by guaranteeing subsequent requests will see a cache miss and fetch the data from the memory, it slows system performance and requires additional pipe passes. Our invention circumvents the need by detecting this situation and ensuring RFAR returns the miss response at the appropriate time to permit LFAR to directly access the data.

Figure 2D:
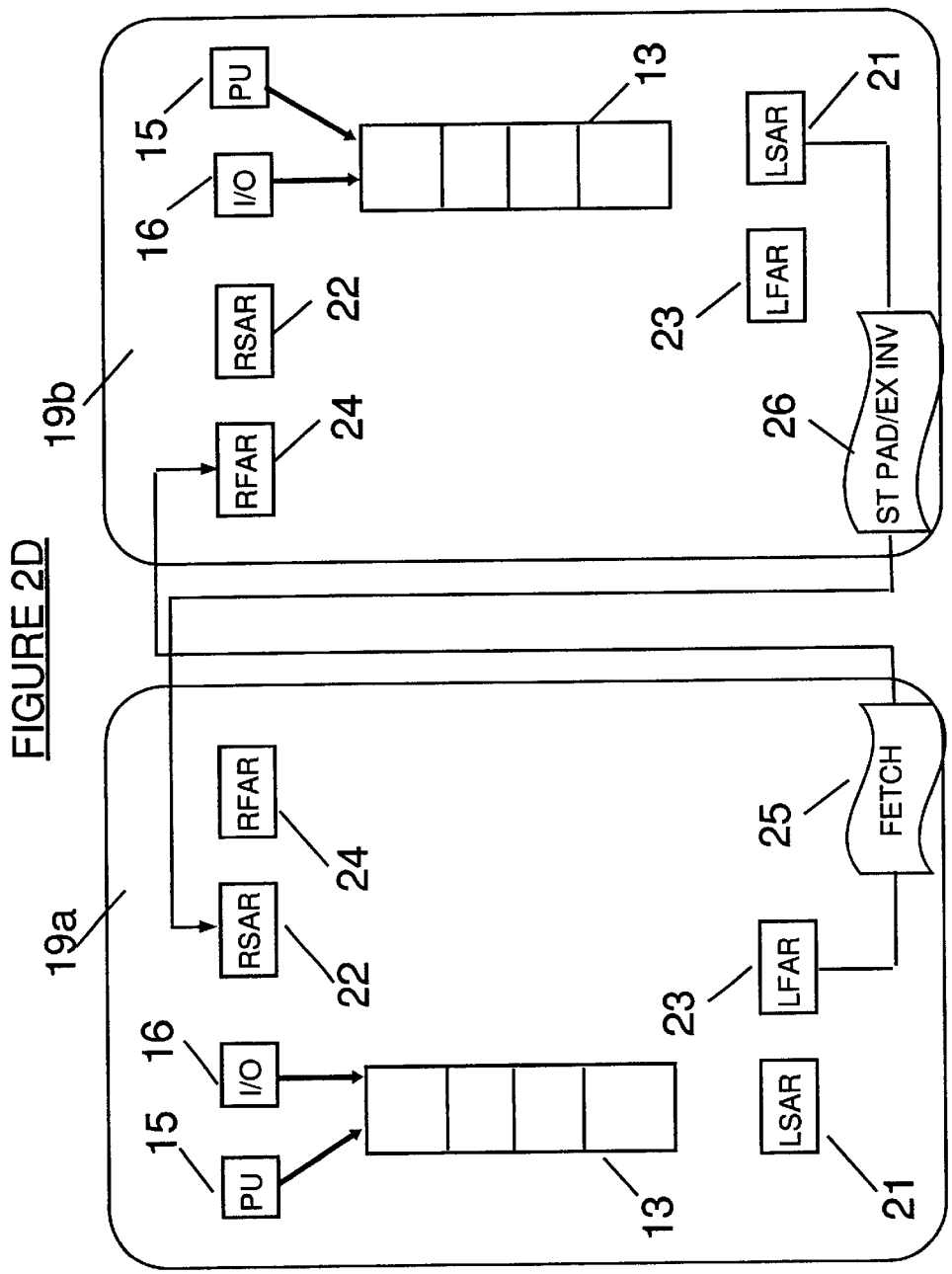

In FIG. 2D the Local Command (25) is again some type of data fetch while the Remote Command (26) is a Store Pad or Exclusive Invalidate. In this scenario, the Remote Command is generated by the remote LSAR (21) on cluster 19*b* processing a Store Pad. If the address is targeting a memory location on the remote cluster (19*b*) then the Remote Command (26) would be an Exclusive Invalidate because the data is being transferred from the LSAR to its own memory on cluster 19*b*. Therefore LSAR only needs to send an Exclusive Invalidate to invalidate the copy of the data that may be cached on cluster 19*a*. In this situation, the RSAR (22) on cluster 19*a* will detect an address compare against the LFAR (23) on cluster 19*a*.

The degree to which LFAR has progressed determines whether RSAR honors or ignores the interlock. The present invention contemplates the use of a data_in_buffer signal between LFAR and RSAR to indicate whether pending fetch data has arrived into the LFAR fetch buffer. If it hasn't yet arrived, RSAR is permitted to ignore the compare and continue with the invalidation. Meanwhile, the RFAR on cluster 19*b* must wait for the LSAR to complete the Store Pad. After invalidating the cache on cluster 19*a*, RSAR returns a final response to LSAR thus allowing it to complete the Store Pad to the memory on cluster 19*b*. The RFAR in cluster 19*b* will then be permitted to continue the fetch and obtain the data from memory. Once the data does arrive on cluster 19*a*, LFAR will simply load it into the cache and revalidate the directory. On the other hand, if the data has already arrived, when RSAR begin processing, it must honor the interlock and wait for LFAR to complete. Once the fetch data is loaded into the cache, RSAR will be permitted to invalidate the copy in cluster 19*a* and return a completion response to LSAR on cluster 19*b*. That, in turn, will allow LSAR to send the Store Pad data out to the memory.

A similar situation exists if the LSAR on cluster 19*b* is initiating a Store Pad to a target memory address on cluster 19*a*. In this case, the Remote Command (26) is the Store Pad operation and RSAR on cluster 19*a* must store the data into memory. The RSAR behaves exactly the same as the aforementioned Exclusive Invalidate case, with the only difference being a data store to memory is performed along with a potential directory invalidation. The other difference is the RFAR (24) on cluster 19*b* will return a "false hit" response over the XI response bus to freeze the LFAR in cluster 19*a* and prevent it from initiating a memory data fetch, and since LSAR is guaranteed to have invalidated the directory prior to RFAR resuming, our invention permits it to return a miss response as explained in the FIG. 2C scenario.

Figure 2E:
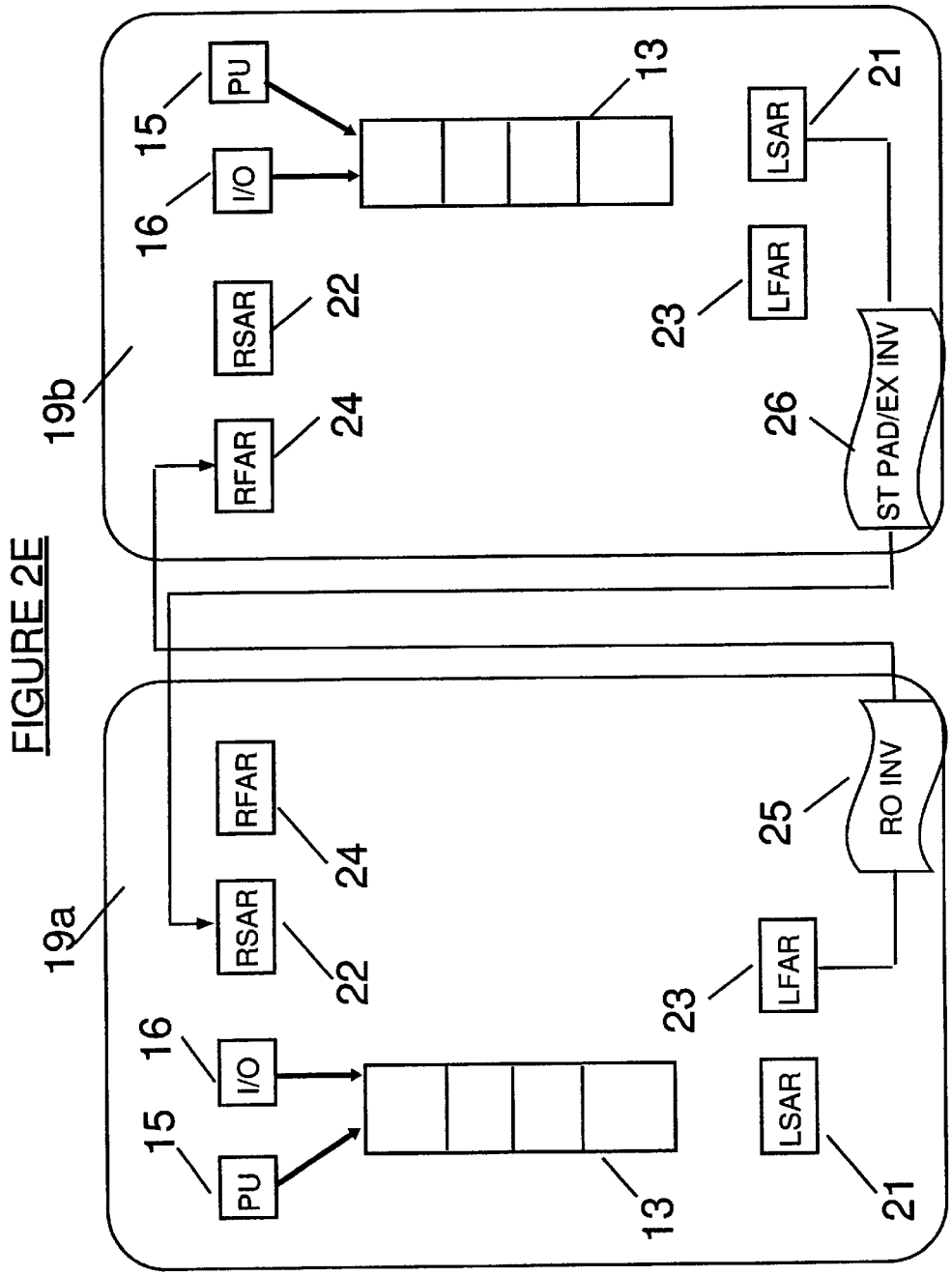

FIG. 2E shows a scenario nearly identical to FIG. 2D, except the Local Command (25) is a Read-Only Invalidate instead of a data fetch. Our invention exploits the fact that data is only transferred (at most) in one direction and both caches will eventually be invalidated. Therefore, in order to prevent a deadlock, the present invention permits the RSAR (22) on cluster 19*a* to ignore the address interlock and continue processing the Store Pad or Exclusive Invalidate. Meanwhile, the Read-Only Invalidate on cluster 19*b* must honor its compare and wait for the Remote Command to complete. Once complete, the RFAR (24) on cluster 19*b* sends back a reject response. The purpose of this is to ensure proper cache coherency by forcing the original requester to recycle back through the Central Pipeline (13) on the local cluster and update the local directory with the proper state. If the RFAR (24) in cluster 19*b* were allowed to simply continue, then the potential would exist for a local processor (on cluster 19*a*) to continue processing a fetch under the pretense of an initial directory state, when in fact the directory state was changed as a result of the Store Pad or Exclusive Invalidate issued from the remote cluster (19*b*).

Figure 2F:
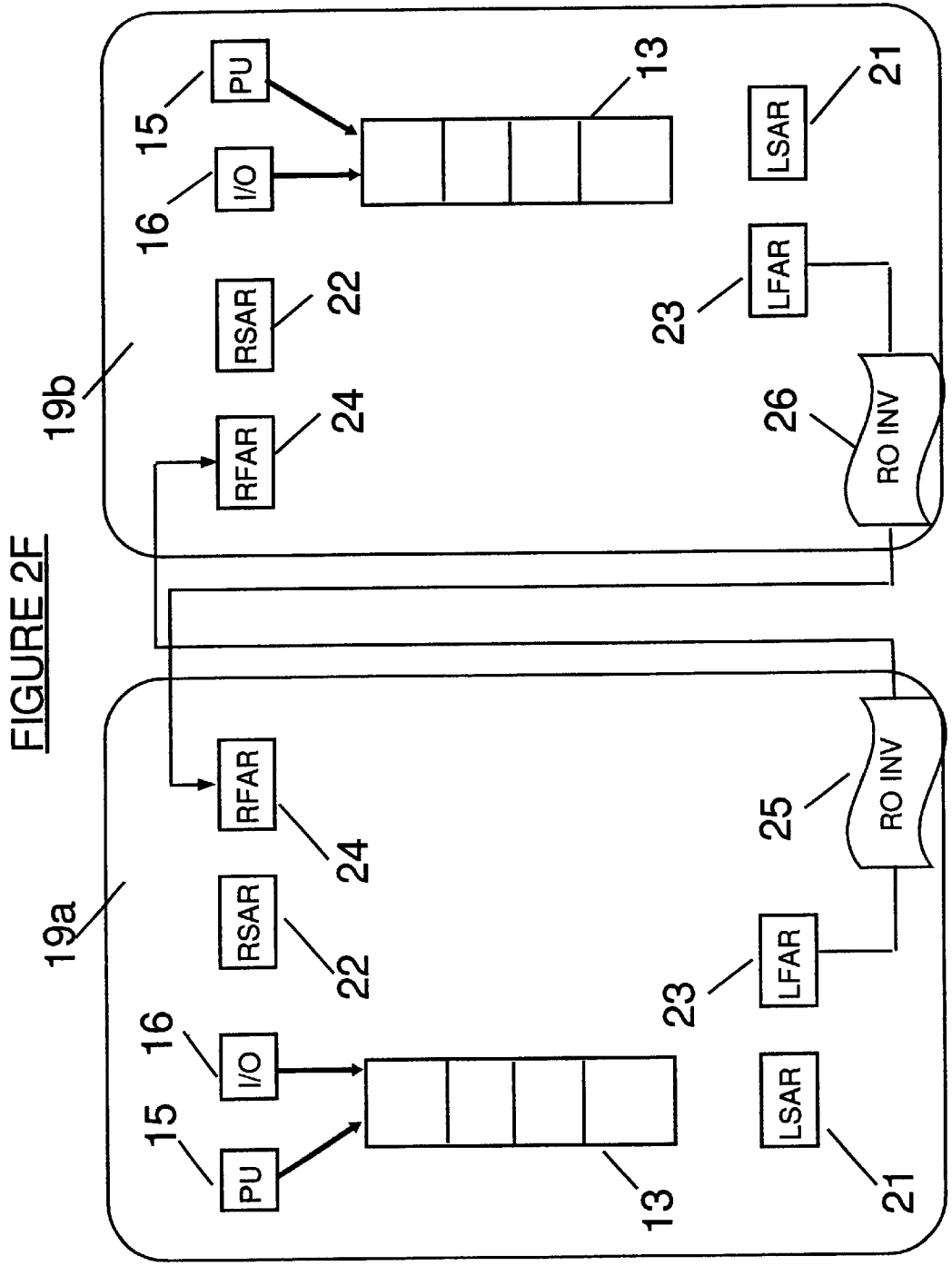

FIG. 2F shows a case where both the Local (25) and Remote (26) Commands are Read-Only Invalidates. In a similar fashion to FIG. 2A where both commands are data fetches, the "local memory" bit determines which RFAR (24) must honor the address interlock and which can proceed. In our examples, the address is always targeting the memory attached to the "local cluster" (19*a*) so our invention dictates that the RFAR (24) on cluster 19*a* must honor the compare and wait. Meanwhile, the remote RFAR on cluster 19b proceeds with invalidating the remote cache. Upon completion, the local RFAR on cluster 19a resumes by returning a reject response and forcing the original requester to retry the operation from the beginning. The reason is the same as for FIG. 2E.

FIG. 2G illustrates a Read-Only Invalidate Local Command (25) processing at the same time as an LRU Cast Out being issued as the Remote Command (26). This situation is a simpler derivative of the previous scenario involving two Read-Only Invalidate commands. In this case, the RSAR processing the LRU Cast Out is always permitted to proceed while the other operation must honor the compare and wait for the LRU to complete. Therefore the RSAR (22) on cluster 19a will complete the LRU data transfer and return a completion response, which in turn releases the interlock on cluster 19b, and permits the RFAR (24) to proceed with the Read-Only Invalidate. Unlike the earlier Read-Only Invalidate scenarios, an LRU is a special case wherein the RFAR can assume that the directory state can't be changed on the remote cluster performing the LRU, therefore the initial state queried by the processor controller is still valid after the Read-Only Invalidate completes.

Figure 2H:
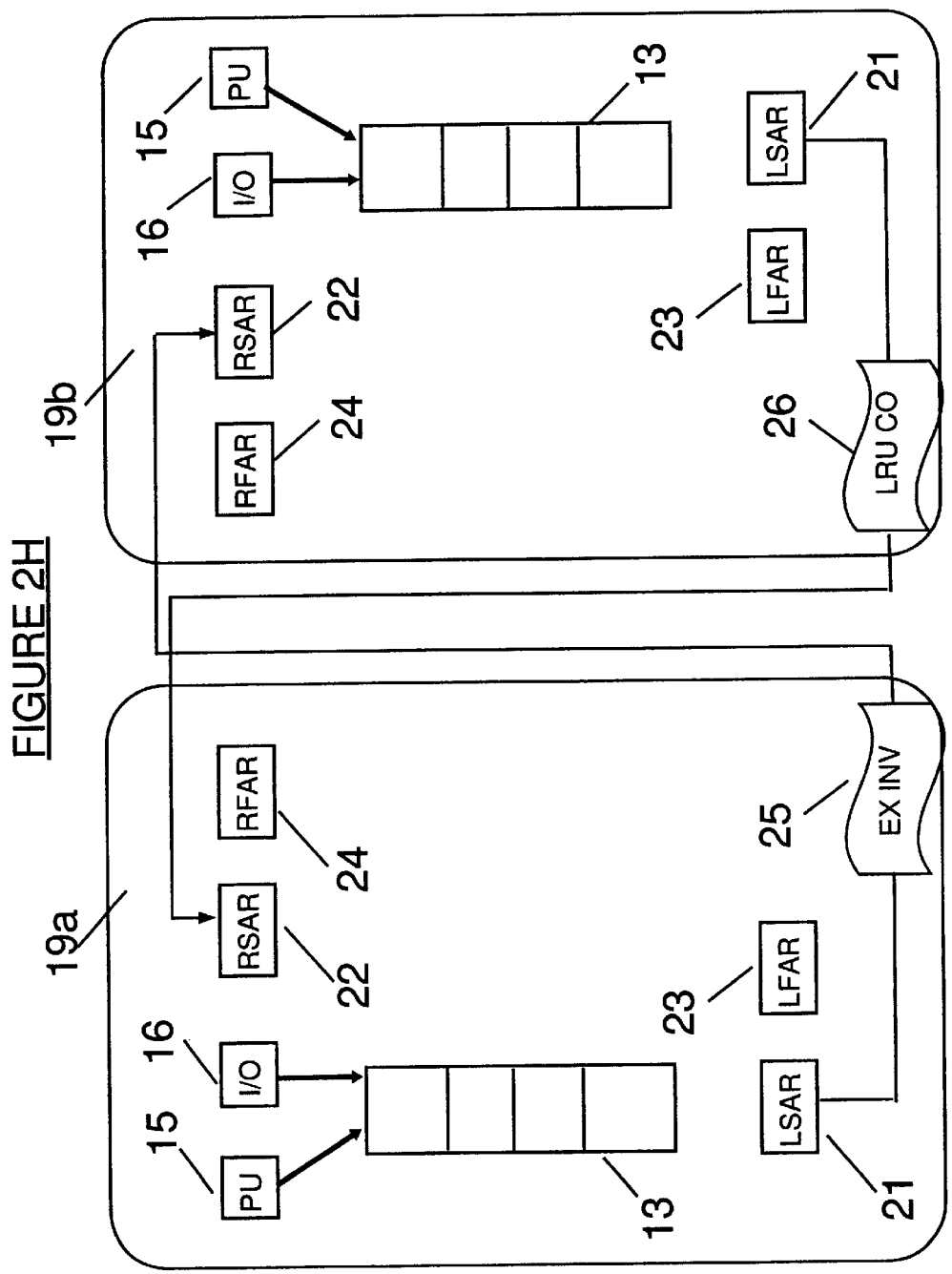
Figure 21:
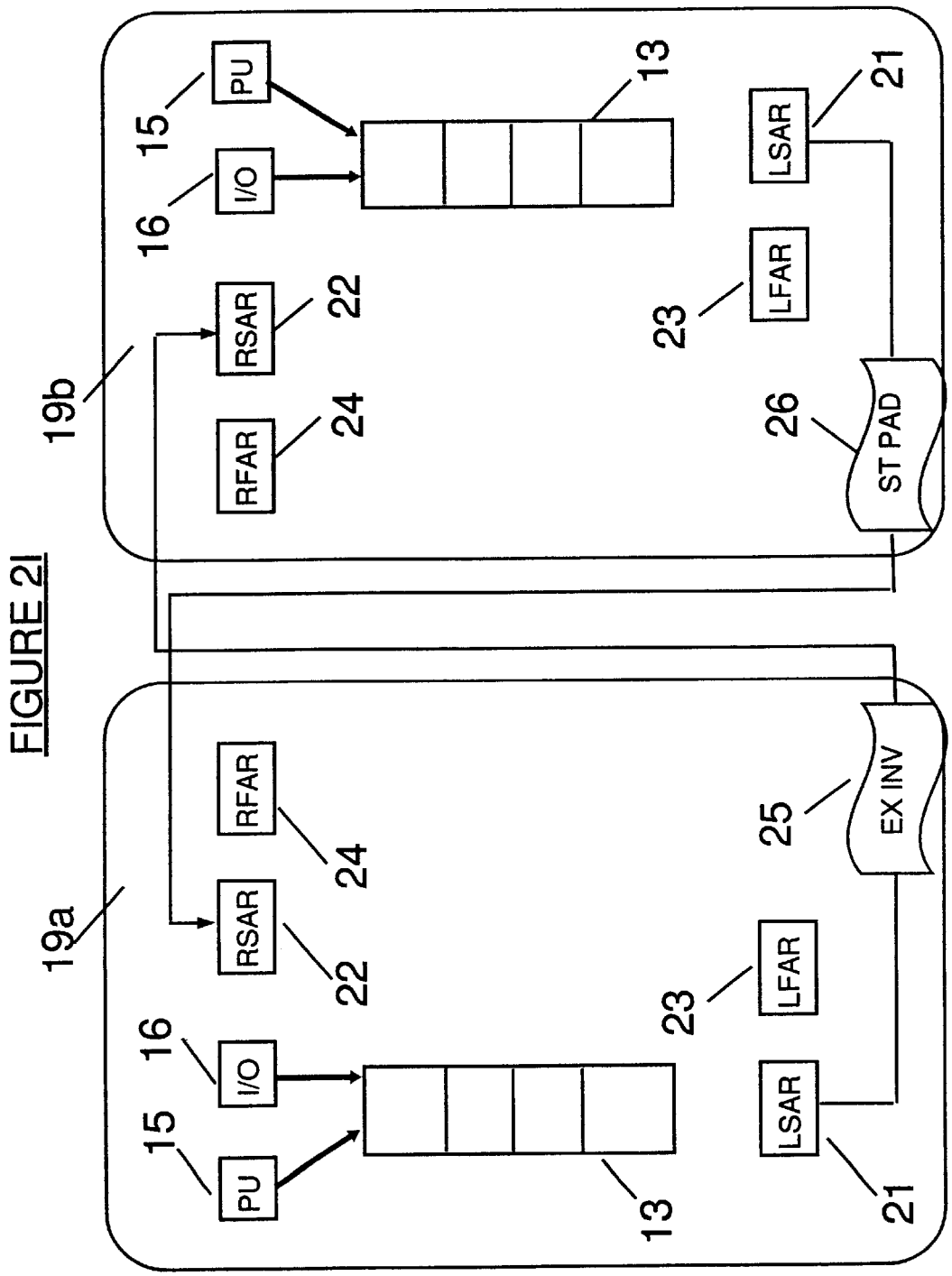

FIG. 2H depicts a case involving only store operations. In this situation, the Local Command (25) is an Exclusive Invalidate which in the preferred embodiment is the result of a Move Page Store or Store Pad operation being performed to a block of storage on the local cluster (19a). Meanwhile, the Remote Command being issued is an LRU Cast Out which is targeting the same block of storage on cluster 19a. As previously mentioned, our invention permits an RSAR processing a remote LRU to always proceed and complete the storage operation. Therefore, the RSAR (22) on cluster 19a will complete the cast out. Similarly, our invention dictates that an RSAR processing any cache coherent operation which interlocks with an LSAR processing an LRU must always wait for LSAR to complete. This is depicted in FIG. 3B and explained in more detail later in the detailed description. In this situation, the RSAR (22) on cluster 19b encounters the LSAR (21) on cluster 19b performing an LRU Cast Out and thus waits for it to finish. Upon completion, the RSAR proceeds with the Exclusive Invalidate. Not only does this method avoid any cross cluster deadlock, but it ensures the LRU Cast Out goes first and the Move Page or Store Pad data winds up overlaying the LRU data in storage. In the case of a Move Page operation, this is significant since the architecture of the preferred embodiment dictates that the data transferred as part of the Move Page fetch must be the data that winds up in the main store location upon completion of the operation.

FIG. 2I illustrates one of the "flexible architecture" situations that the present invention exploits to enhance system performance. These are cases where an LSAR processing a Store Pad or Move Page Store interlocks against an RSAR processing a Move Page Store, Store Pad, Exclusive Invalidate, or I/O Store. In these situations, simultaneous main memory storage operations are being processed and the architecture of the preferred embodiment does not prescribe an order of completion for these types of stores. Therefore, our invention elects to have the RSAR automatically abort its operation in favor of allowing the LSAR to complete its store. This provides the same result as the RSAR performing and completing its store, only to have the LSAR follow up with its store and overlay the RSAR data with the LSAR data. In the example shown in FIG. 2I, Store Pads are initiated on both clusters. Since the target memory address is on cluster 19a, the Remote Command (26) is a Store Pad while the Local Command (25) is the Exclusive Invalidate that is associated with the LSAR Store Command on cluster 19a.

According the abort rules set forth in the present invention, both RSARs will interlock against LSARs processing Store Pads, therefore both RSARs will abort their respective operations. The abort simply means the data transfer or directory update portion of the operation is omitted, but the RSAR still returns a normal completion response. This permits the corresponding LSAR on the other cluster to proceed. In this scenario when the RSAR (22) on cluster 19a returns a completion response, the LSAR (21) on cluster 19b finishes the operation by invalidating the cache on cluster 19b, without knowing the Store Pad data was never actually stored into main memory. Meanwhile, the RSAR (22) on cluster 19b aborts its Exclusive Invalidate and returns a response back to the LSAR (21) on cluster 19a. This enables the LSAR (21) on cluster 19a to continue with transferring its Store Pad data out to the memory on cluster 19a. Architecturally, this is no different than the RSAR on cluster 19a performing the store for the Remote Store Pad data, only to have that data overlaid by the subsequent store from the LSAR on cluster 19a. Our invention recognizes this flexibility in the architecture and uses it to omit a wasteful data transfer thereby improving overall memory throughput.

The aforementioned figures depict on a case-by-case basis the methods our invention employs to recognize all the potential combinations of store and fetch operations that can induce a cross cluster deadlock when they are being processed simultaneously. The methods described herein are applicable to many combinations of store and fetch operations which extend beyond the traditional data transfers to also include cache management operations such as Read-Only and Exclusive Invalidate. Although every possible operational combination is not illustrated in this application, one skilled in the art can appreciate how these methods can be applied to architectures beyond that described in the preferred embodiment.

FIG. 3A depicts the multitude of controllers with their prescribed affinity. Every remote operation is initiated by a local Fetch or Store Controller. In the preferred embodiment, these controllers are arranged in groups of four per centralized pipe (13). The group of four Local Store Controllers (LSAR 31) initiate all remote store operations by transmitting the store command through the RSC Interface Controller (10). On the remote cluster there exists a matching set of four Remote Store Controllers (RSAR 32) who service the store operations on behalf of the local controller. The present invention utilizes a dedicated 1-to-1 affinity between the local LSAR and remote RSAR controllers to assist in preventing cross-cluster deadlocks as well as improving overall system throughput by permitting four concurrent operations per pipeline to be in progress on either cluster (19). Although the present invention doesn't describe the Fetch Controllers in detail, FIG. 3A also depicts the same relationship between the group of four Local Fetch Controllers (33) and their affinity to the four Remote Fetch Controllers (34) on the other cluster. The important aspect of the preferred embodiment is that the present system structure permits a total of 8 Fetch and Store operations to be in progress in a cluster at any time. The present invention represents a single "instantiation" of the four RSAR controllers and thereby must contend with the other seven requesters to vie for priority into the Central Pipeline (13).

The present invention provides several rules governing address compares and what actions should be taken. If the current operation compares against any CP fetch or I/O operation which entered the pipeline 1, 2 or 3 cycles ahead of the current RSAR operation, then the Remote Store Controller must wait for the compare to clear and recycle its request. This is also true for Store Pads, Move Page or Cache Purge operations 1 cycle ahead of the current RSAR operation. Once an operation is loaded into an LFAR, the present invention will honor any address compare and wait for it to clear unless one of two conditions is true:

1. LFAR is processing a read-only invalidate command which simply invalidates the current copy of the data in the cache. In this case, our invention can ignore the compare because all store operations except for I/O Stores will either invalidate the directory or store directly to main memory bypassing cache coherency. I/O Stores that hit the cache will process in their normal fashion and complete with a final directory state of valid. The preferred embodiment uses an interlocking mechanism between LFAR and RSAR which guarantees the read-only invalidate will happen before the I/O Store completes.
2. LFAR is processing a data fetch but the data has not yet been returned. In this case, the interlocking mechanism between LFAR and RSAR guarantees that LFAR can't change the cache state until after the RSAR operation completes.

For operations that compare against operations being processed by a Local Store Controller (LSAR), the LSAR Compare Chart (35) in FIG. 3B is used to determine the resultant action. Regardless of what operation LSAR is processing, if RSAR is processing an LRU Cast Out or Store Physical Absolute, then the Remote Storage Controller can safely ignore the compare since these operations bypass cache coherency. Additionally, if LSAR is processing an I/O Store, the architecture in the preferred embodiment permits RSAR to safely ignore the compare because an I/O Store can be processed in any order relative to other memory store operations. If LSAR is processing an LRU, the Remote Store Controller must always wait for the compare to clear.

In cases where LSAR is processing a Store Pad or Move Page Store, and RSAR is processing any cache coherent operation, the present invention employs a novel feature called an operational abort In these situations, the Remote Store Controller simply aborts the current store operation. This is permissible since the final cache state for Move Page Store and Store Pads is always an invalid state with the data being sent to main memory. Therefore, the abort gives the appearance that the RSAR performed its operation, only to have the LSAR operation succeed it and invalidate the cache entry and overlay the data in main memory. Thus our invention doesn't bother to tie up the main memory data path or take the time to transfer the data, and instead lets LSAR always win and complete it's operation. This also frees up the Remote Store Controller sooner so it can accept a new command.

Figure 4:
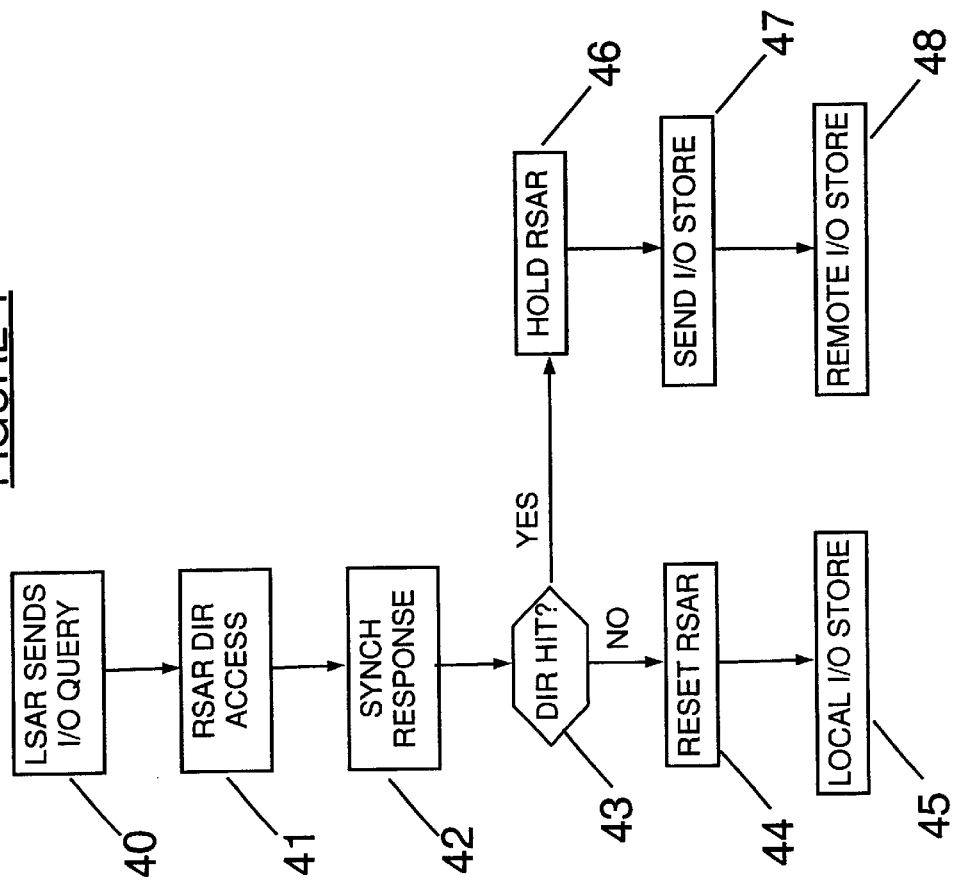
FIG. 4 illustrates the flowchart for processing Remote I/O Store operations

Another aspect of the present invention involves a new method for performing I/O Store operations which minimizes the number of local and remote resources required to perform the operation. In the architecture pertaining to the preferred embodiment, an I/O device can perform a store operation asynchronously to any storage address in the system, even if that address is currently owned by a processor. The cache management protocol ensures that any owning processor relinquishes its ownership and stores any modifications prior to processing the I/O store. However, the final location of the I/O Store data is not dictated by the architecture or the cache management protocol. The following method is used to illustrate how an I/O Store initiated from an I/O adapter on the "local" node is processed.

i. I/O Store targets the memory attached to the "remote" cluster and misses the local cache. In this situation, LSAR unconditionally transmits the data to the RSAR on the remote cluster and the Remote Storage Controller follows the appropriate sequence in FIG. 3B depending on the remote cache state. The data is either stored into the remote cache or the remote main memory.

ii. I/O Store targets the memory attached to any cluster and hits the local cache. In this case, the store is performed into the local cache, thus eliminating the need to busy the cross-cluster data bus. If the data hits exclusive then, by definition, this can be the only copy of the data. However, if the data hits read-only, with another read-only copy in the remote cache, then LFAR sends a read-only invalidate command to the RFAR on the remote cluster, thus invalidating the remote copy.

iii. I/O Store targets the memory attached to the "local" cluster and misses the local cache. Our invention improves upon previous designs of large SMP systems where a special force cast out command would be sent across the interface to interrogate the remote cache, and if present, LSAR would initiate a cast out operation to return the data to the local cluster. This involved the use of four resources; the local LSAR initiating the force cast out interrogation, the remote RSAR processing the force cast out, the remote LSAR performing the cast out, and the local RSAR receiving the cast out. FIG. 4 illustrates the method used by the present invention. First, the local LSAR sends a I/O Query Command (40) to the Remote Storage Controller. RSAR accesses the directory to determine whether the data resides in the remote cache (41). The Response Logic (25) is used to send an interrogate response indicating hit or miss (42). If the directory result indicates a miss (43), then the Remote Storage Controller resets itself (44) and the I/O Store is performed to the local memory. However, if the directory results indicate a hit (43), then our invention retains the RSAR resource (46), and the local LSAR follows up with an I/O Store command (47). The Remote Store Controller then processes this as if it were case (i) and store the data into the remote cache. This method ensures data is only transferred once using a single LSAR/RSAR pair just like all other remote store operations.

Our invention further contemplates the use of a Remote Storage Controller capable of processing synchronous and asynchronous store operations, and further exploiting the asynchronous operations to achieve deadlock avoidance. In the preferred embodiment a synchronous store operation is one which must maintain cache coherency throughout the System Controller. In order to do so, each operation is processed through the multistage Central Pipeline (13) to permit other controllers to perform address compares and set the appropriate address interlocks. These address interlocks are themselves a form of deadlock avoidance since they ensure that one requester finishes processing a block of storage before another requester can process the same block of storage. However, these interlocks fall short of avoiding deadlocks that are created as a result of resource contention such as a controller requiring an LSAR (and associated buffer) to become available. If the LSAR is currently working on a remote store operation, it must wait until the corresponding RSAR on the remote cluster completes the operation.

In the preferred embodiment, certain operations such as LRU Cast Outs don't require cache management. In the case of LRU Cast Outs, data is only stored to main memory if it has been modified by a processor that has previously acquired the data with exclusive ownership. Therefore, by the definition of the cache management scheme employed in the present invention, the line of data can't exist in any remote cache in a valid state.

Figure 5:
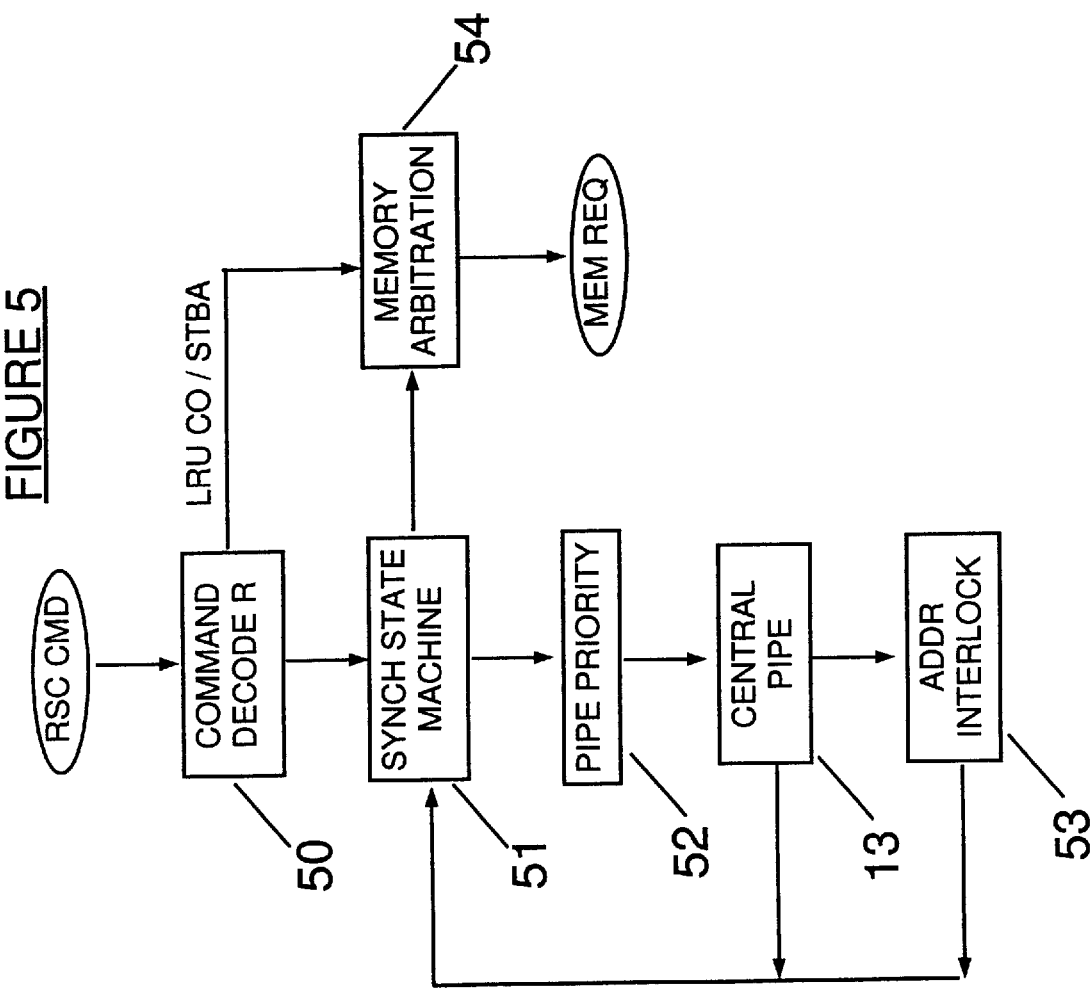
FIG. 5 depicts the coexistence of Asynchronous and Synchronous operations which can be exploited to avoid deadlocks.

FIG. 5 depicts the high level block diagram illustrating the architecture of the Remote Storage Controller in the preferred embodiment. The incoming RSC Command is received into RSAR and enters a Command Decoder (50). If the command decodes to a synchronous operation such as an I/O Store, Move Page Store, Exclusive Invalidate, etc., then it enters the Synchronous State Machine (51). This logic is responsible for performing all state (or Mode) transitions that are required to not only perform the store operation into main memory or the shared cache, but also perform an necessary directory updates to maintain cache coherency. As the command progresses through the various modes (states), requests are sent to the Pipe Pre-Priority Station (52) which is responsible for arbitrating between the plurality of Remote Fetch, Store and Millicode Controllers in the preferred embodiment. The request eventually enters the Central Pipeline (13) where the Address Interlocks (53) are performed to ensure no other requester is processing the same storage block. If an interlock exists, the Remote Store Controller must wait until the interlock clears then recycle its request into the Pipe Pre-Priority Station (52). Once there are no further address compares, the pipe operation progresses until eventual completion.

In the case where the Command Decoder (50) detects an LRU Cast Out or Store Physical Absolute, it is immediately forwarded to the Memory Arbitration Unit (54) which selects one of the four possible RSAR memory requests. Once selected, the memory request is forwarded to the memory interface priority station for processing. Bypassing the Synchronous State Machine (51) and Central Pipeline (13) offer two advantages. First, no address interlocks are performed, thus guaranteeing the operation will be sent to the memory interface as fast as the arbitration unit can select it. Secondly, the throughput of these operations is limited only by the bandwidth of the memory interface and memory subsystem. Even if the System Controller is extremely busy processing requests through the pipeline, the asynchronous operations are unaffected by any queues forming at the entrance to the pipe. The resulting effect is not only improved system performance for store operations, but an additional form of deadlock avoidance since another requester is permitted to access that storage block and begin processing immediately without the need to wait for RSAR to complete the store operation. This feature also enables RSAR to complete these operations sooner, thereby freeing up the corresponding LSAR on the local cluster to also become available sooner and either release any requesters currently interlocked against it or get loaded with a new operation that may be required to break a pending deadlock.

By incorporating the Command Decoder (50), Synchronous State Machine (51) and Memory Arbitration Unit (54), our invention is capable of handling any combination of synchronous and asynchronous operations among the four Remote Store Controllers. One skilled in the art could appreciate how the present invention is also applicable to operations other than those described in the preferred embodiment and is in no way limited to four controllers. For instance, the apparatus disclosed herein could be implemented using a large number of Remote Store Controllers to permit a great degree of concurrent processing as long as sufficient data paths and resources could be implemented to support the resulting system traffic.

In addition to providing several means for improving performance and maximizing system throughput, our invention also affords a high degree of reliability and availability. In a large SMP system with many resources, it's often possible for several controllers to deadlock against each other because one is holding a resource that the other needs to complete it's operation. This situation can be aggravated if new operations can continually enter the pipeline and possibly tie up further resources. Therefore, the present invention utilizes Fast Hang Quiesce logic embedded in the controllers of the preferred embodiment which serve two purposes. First and foremost it works in an active capacity to detect if the current operation is hung and not making forward progress. In this case it broadcasts a signal which suppresses any new operations from entering the Centralized Pipeline (13). The other aspect of the Fast Hang Quiesce logic is to act in a passive mode and monitor the other controllers to see if they are hung. If so, the monitoring controller, under certain conditions, will reject its current operation.

Figure 6:
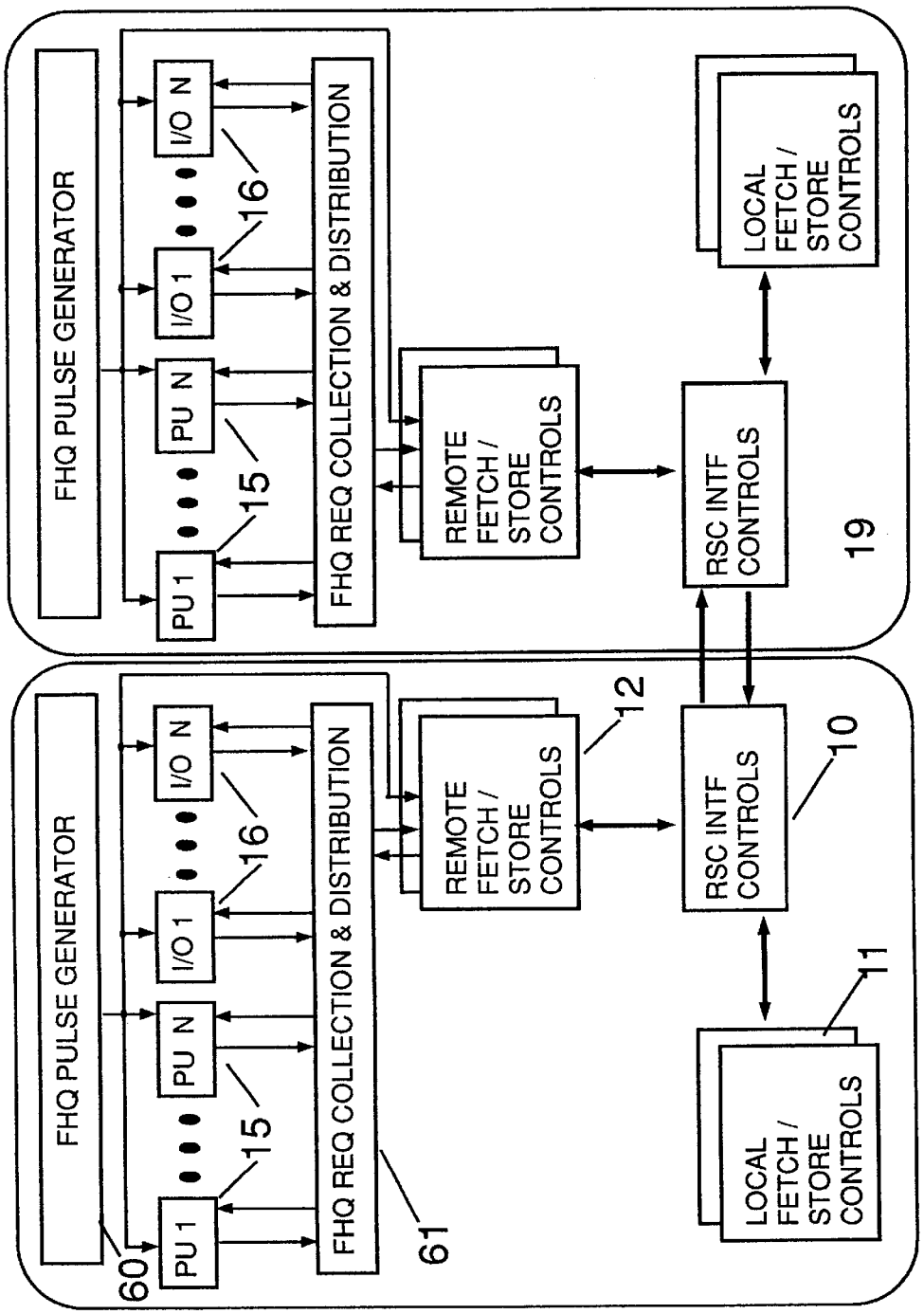
FIG. 6 illustrates the Fast Hang Quiesce mechanism

FIG. 6 illustrates the fast hang quiesce (fhq) pulse generation and distribution scheme within a binodal symmetrical MP system. A fhq pulse generator (60) sends periodic pulses to each of the PU controllers (15), IO controllers (16), and Remote Fetch and Remote Store controllers (12). If the number of fhq pulses received by a controller reaches a predetermined count known as the internal hang limit, that controller will generate its own internal hang pulse and sends it to the fhq collection and distribution logic (61) which in turn broadcasts this pulse to all other controllers. Receipt of a fhq pulse by a PU or IO controller results in all subsequent requests to that controller being forced inactive until all currently active operations are completed. Receipt of the fhq condition by a Remote Fetch or Remote Store controller results in a reject response being generated by said controller if the fhq pulse is received while processing a valid remote operation.

FIG. 7 illustrates the response generation scheme that is used to activate the response request latch (77) and encoded response request register (78) within a Remote Fetch or Remote Store controller. The response request generation logic (71) is driven by the Remote Fetch or Remote Store internal state machine (70). The response request generation logic also receives internal fhq pulses generated by the Remote Fetch or Remote Store controller itself along with external fhq pulses that are sent to the Remote Fetch or Remote Store controller via the fhq collection and distribution logic shown in FIG. 6. The response request generation logic includes logic to block activation of reject responses due to an internal or external fhq pulse if the state of the internal state machine is such that activation of a reject response could lead to a loop or deadlock condition. These blocking conditions are:

1. The RFAR or RSAR is already in the process of generating a response.
2. The RFAR or RSAR is in one of the following states:
   a. The internal state machine is not in the initial state
   b. The internal state machine is in the initial state, it hasn't encountered any compare and it's not currently waiting for any resources.
3. A reject response for this RFAR or RSAR has already been issued during this quiesce period.

In the first two cases, the current operation has progressed beyond the point where it is safe to terminate it, and the preferred embodiment advocates permitting the operation to complete on its own accord in order to free up resources potentially required to break any pending deadlock. In the third case, the restriction exists to prevent the present invention from entering into a synchronous loop whereby the same operation is retried indefinitely with each attempt triggering a reject response, which in turn results in another retry attempt.

The response generation logic is also controlled by four programmable disable switches (72, 73, 74, 75) which provide additional flexibility since these switches alter the behavior of the Remote Fetch and Store Controllers during Fast Hang Quiesce activity. Our invention contemplates the use of scan-only latches which can be set or reset through firmware thus permitting unknown deadlock scenarios in the field to be resolved.

1. Reject current op: Results in reject response for current RFAR or RSAR op assuming none of the blocking conditions described above are active.
2. Reject next fetch: Results in reject response for next RFAR op (instead of current RFAR op) assuming none of the blocking conditions described above are active.
3. Disable reject due to self: Blocks forcing of reject response if this RFAR or RSAR initiates fhq request.
4. Disable reject due to others: Blocks forcing of reject response if a requester other than this RFAR or RSAR initiated the fhq request.

Any combination of settings of these four disable switches is allowed with the restriction that the "reject current op" disable switch (74) and the "reject next op" disable switch (75) must not both be active at the same time.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for deadlock avoidance in a clustered symmetric multiprocessor system having a plurality of clusters interfaced with one another, each cluster having:
    (a) a local fetch interface controller, and
    (b) a local store interface controller, and
    (c) a remote fetch controller, and
    (d) a remote storage controller, and
    (e) a local-to-remote data bus and
    (f) an interface controller,
    (g) a plurality of processors,
    (h) a shared cache memory,
    (i) a plurality of I/O adapters, and
    (j) a main memory accessible from the cluster, said method comprising the steps of:
        detecting a plurality of storage requests between a local and a remote cluster,
        responding to the detected storage requests to permit one request of a plurality of said storage requests to proceed while actively aborting all remaining storage requests of said plurality of storage requests and notifying the requesting local controllers of a successful completion of an aborted storage request,
        causing a remote storage controller to store data in response to said one storage request which was permitted to proceed, and
        then storing the data of said response that proceeded from said remote storage controller into said main memory.

2. A method for deadlock avoidance in a clustered symmetric multiprocessor system having a plurality of clusters interfaced with one another, each cluster having:
    (a) a local fetch interface controller, and
    (b) a local store interface controller, and
    (c) a remote fetch controller, and
    (d) a remote storage controller, and
    (e) a local-to-remote data bus and
    (f) an interface controller,
    (g) a plurality of processors,
    (h) a shared cache memory,
    (i) a plurality of I/O adapters, and
    (j) a main memory accessible from the cluster,
    said method comprising the steps of:
        detecting a plurality of fetch requests between a local and a remote cluster,
        responding to the detected fetch requests to permit at least one request of said plurality of fetch requests to proceed while actively delaying action among remaining requests of said plurality of requests,
        causing a remote fetch controller to wait until said one request which was permitted to proceed has completed, and
        then proceeding with a delayed request among said remaining requests of said plurality of requests,
            whereby deadlock avoidance is achieved through the use of asynchronous cast outs which are permitted direct access to shared memory without the need to perform address compare interlocks against other simultaneous operations, and ensuring the cast out will complete without interruption from said simultaneous operations.

3. A method for deadlock avoidance in a clustered symmetric multiprocessor system having a plurality of clusters interfaced with one another, each cluster having:
    (a) a local fetch interface controller, and
    (b) a local store interface controller, and
    (c) a remote fetch controller, and
    (d) a remote storage controller, and
    (e) a local-to-remote data bus and
    (f) an interface controller,
    (g) a plurality of processors,
    (h) a shared cache memory,
    (i) a plurality of I/O adapters, and
    (j) a main memory accessible from the cluster,
    said method comprising the steps of:
        detecting a plurality of fetch requests between a local and a remote cluster,
        responding to the detected fetch requests to permit at least one request of said plurality of fetch requests to proceed while actively delaying action among remaining requests of said plurality of requests,
        causing a remote fetch controller to wait until said one request which was permitted to proceed has completed, and
        then proceeding with a delayed request among said remaining requests of said plurality of requests,
            whereby memory operations utilize an abort mechanism which allows the move page operation to cease prior to performing any memory access and permit other operations to continue and wherein said memory operations include any combination of a. said page move store operations involving movement of data from one memory location to a target memory location and
b. cache coherency operations involving invalidation of remote shared caches and
c. I/O store operations involving storage of I/O data into main memory or a shared cache and
d. store pad operations involving replication of data patterns into main memory.

4. A method for deadlock avoidance in a clustered symmetric multiprocessor system having a plurality of clusters interfaced with one another, each cluster having:

(a) a local fetch interface controller, and
(b) a local store interface controller, and
(c) a remote fetch controller, and
(d) a remote storage controller, and
(e) a local-to-remote data bus and
(f) an interface controller,
(g) a plurality of processors,
(h) a shared cache memory,
(i) a plurality of I/O adapters, and
(j) a main memory accessible from the cluster, said method comprising the steps of:
  detecting a plurality of fetch requests between a local and a remote cluster,
  responding to the detected fetch requests to permit at least one request of said plurality of fetch requests to proceed while actively delaying action among remaining requests of said plurality of requests,
  causing a remote fetch controller to wait until said one request which was permitted to proceed has completed, and
  then proceeding with a delayed request among said remaining requests of said plurality of requests,
    whereby a remote fetch controller processing a fetch request on behalf of a local memory controller utilizes a miss response in place of a reject response which permits the operation to complete without the need to recycle the operation back to the initiating processor.

5. A method for deadlock avoidance in a clustered symmetric multiprocessor system having a plurality of clusters interfaced with one another, each cluster having:

(a) a local fetch interface controller, and
(b) a local store interface controller, and
(c) a remote fetch controller, and
(d) a remote storage controller, and
(e) a local-to-remote data bus and
(f) an interface controller,
(g) a plurality of processors,
(h) a shared cache memory,
(i) a plurality of I/O adapters, and
(j) a main memory accessible from the cluster, said method comprising the steps of:
  detecting a plurality of fetch requests between a local and a remote cluster,
  responding to the detected fetch requests to permit at least one request of said plurality of fetch requests to proceed while actively delaying action among remaining requests of said plurality of requests,
  causing a remote fetch controller to wait until said one request which was permitted to proceed has completed, and
  then proceeding with a delayed request among said remaining requests of said plurality of requests,
  and further comprising a fast hang quiesce mechanism embedded in the remote fetch and store controllers preventing deadlocks by detecting system hangs and causing the controllers to reject their current operations in an effort to permit the system operation to complete.

6. A method for deadlock avoidance in a clustered symmetric multiprocessor system having a plurality of clusters interfaced with one another, each cluster having:

(a) a local fetch interface controller, and
(b) a local store interface controller, and
(c) a remote fetch controller, and
(d) a remote storage controller, and
(e) a local-to-remote data bus and
(f) an interface controller,
(g) a plurality of processors,
(h) a shared cache memory,
(i) a plurality of I/O adapters, and
(j) a main memory accessible from the cluster, said method comprising the steps of:
  detecting a plurality of fetch requests between a local and a remote cluster,
  responding to the detected fetch requests to permit at least one request of said plurality of fetch requests to proceed while actively delaying action among remaining requests of said plurality of requests,
  causing a remote fetch controller to wait until said one request which was permitted to proceed has completed, and
  then proceeding with a delayed request among said remaining requests of said plurality of requests,
  and further comprising a fast hang quiesce mechanism embedded in the remote fetch and store controllers preventing deadlocks caused by the controllers' own operations by detecting an internally generated hang period and using this hang period to signal the other controllers to quiesce their pending operations to permit the current remote fetch and/or store operation to complete.

* * * * *